(12) United States Patent
Hong et al.

(10) Patent No.: US 9,286,410 B2
(45) Date of Patent: Mar. 15, 2016

(54) ELECTRONIC DOCUMENT RETRIEVAL AND REPORTING USING PRE-SPECIFIED WORD/OPERATOR COMBINATIONS

(71) Applicants: Jiang Hong, San Jose, CA (US); David Greetham, Houston, TX (US)

(72) Inventors: Jiang Hong, San Jose, CA (US); David Greetham, Houston, TX (US)

(73) Assignee: Ricoh Company, Ltd., Tokyo (JP)

( * ) Notice: Subject to any disclaimer, the term of this patent is extended or adjusted under 35 U.S.C. 154(b) by 100 days.

(21) Appl. No.: 14/074,503

(22) Filed: Nov. 7, 2013

(65) Prior Publication Data

US 2015/0128022 A1 May 7, 2015

(51) Int. Cl.
G06F 17/00 (2006.01)
G06F 17/30 (2006.01)
G06F 17/22 (2006.01)

(52) U.S. Cl.
CPC ...... *G06F 17/30967* (2013.01); *G06F 17/2247* (2013.01); *G06F 17/30637* (2013.01); *G06F 17/30864* (2013.01)

(58) Field of Classification Search
None
See application file for complete search history.

(56) References Cited

U.S. PATENT DOCUMENTS

| 5,963,938 | A | 10/1999 | Wilson et al. | |
|---|---|---|---|---|
| 6,490,575 | B1 | 12/2002 | Berstis | |
| 6,925,608 | B1 * | 8/2005 | Neale et al. | 715/763 |
| 7,383,513 | B2 * | 6/2008 | Goldberg et al. | 715/763 |
| 7,483,869 | B2 * | 1/2009 | Kumar | 706/47 |
| 7,516,118 | B1 | 4/2009 | Badros | |
| 7,739,221 | B2 * | 6/2010 | Lawler et al. | 707/770 |
| 7,890,503 | B2 | 2/2011 | Murarka | |
| 8,326,836 | B1 | 12/2012 | Pike | |
| 8,423,541 | B1 | 4/2013 | Baluja | |
| 8,549,436 | B1 | 10/2013 | Capriati | |
| 8,560,531 | B2 * | 10/2013 | Megler et al. | 707/723 |
| 8,793,266 | B2 * | 7/2014 | Ishikawa et al. | 707/758 |
| 9,020,936 | B2 * | 4/2015 | Svore et al. | 707/728 |
| 2004/0039933 | A1 | 2/2004 | Martin | |
| 2005/0004911 | A1 * | 1/2005 | Goldberg et al. | 707/7 |
| 2005/0246303 | A1 | 11/2005 | Kumar | |
| 2006/0036565 | A1 | 2/2006 | Bruecken | |
| 2006/0074902 | A1 | 4/2006 | Anderson | |

(Continued)

FOREIGN PATENT DOCUMENTS

| EP | 2 728 494 A1 | 5/2014 |
|---|---|---|
| EP | 2728494 A1 * | 5/2014 |

OTHER PUBLICATIONS

European Patent Office, "Search Report" in application No. 14191009.1-1951, dated Mar. 24, 2014, 9 pages.

(Continued)

*Primary Examiner* — Maikhanh Nguyen
(74) *Attorney, Agent, or Firm* — Hickman Palermo Becker Bingham LLP; Edward A. Becker

(57) ABSTRACT

An approach is provided for retrieving electronic documents. The approach provides a Web-based graphical user interface that allows users to construct complex queries that include Boolean clauses, proximity clauses and/or keyword phrases, without requiring the users to have a working knowledge of query languages. The Web-based graphical user interface also allows users to specify a semantic meaning for one or more search terms. The approach also allows users to generate various reports for search results. Various filters may be applied to manage the amount of reporting data and semantic meanings may be applied to increase relevancy. A time cost estimator provides an estimated review time for search results.

14 Claims, 22 Drawing Sheets

(56) References Cited

U.S. PATENT DOCUMENTS

| | | |
|---|---|---|
| 2006/0155598 A1 | 7/2006 | Spurr |
| 2006/0161535 A1 | 7/2006 | Holbrook |
| 2006/0190436 A1 | 8/2006 | Richardson |
| 2007/0100795 A1 | 5/2007 | Davies |
| 2008/0189608 A1 | 8/2008 | Nurmi |
| 2008/0201318 A1 | 8/2008 | McNew |
| 2008/0275868 A1* | 11/2008 | Zer ................... G06F 17/30398 |
| 2009/0073501 A1 | 3/2009 | Gutarin |
| 2009/0133116 A1 | 5/2009 | Waisbard |
| 2009/0327257 A1 | 12/2009 | Abouzeid |
| 2010/0077301 A1 | 3/2010 | Bodnick |
| 2010/0153363 A1 | 6/2010 | Suzuki |
| 2010/0185600 A1 | 7/2010 | Shin |
| 2010/0290094 A1 | 11/2010 | Nagarajan |
| 2010/0299701 A1 | 11/2010 | Liu |
| 2011/0029563 A1 | 2/2011 | Coiera |
| 2011/0040752 A1* | 2/2011 | Svore et al. ................... 707/728 |
| 2011/0238486 A1 | 9/2011 | Liu |
| 2012/0005148 A1 | 1/2012 | Horvitz |
| 2012/0084328 A1* | 4/2012 | Ishikawa ........... G06F 17/30651 |
| | | 707/805 |
| 2012/0246153 A1 | 9/2012 | Pehle |
| 2013/0006976 A1* | 1/2013 | Megler .............. G06F 17/30554 |
| | | 707/725 |
| 2013/0100139 A1 | 4/2013 | Schliesser |
| 2013/0246219 A1 | 9/2013 | Mishanski |
| 2014/0074951 A1 | 3/2014 | Misir |
| 2015/0127634 A1 | 5/2015 | Hong et al. |
| 2015/0220519 A1 | 8/2015 | Motoyama et al. |
| 2015/0220638 A1 | 8/2015 | Motoyama et al. |
| 2015/0220644 A1 | 8/2015 | Motoyama et al. |

OTHER PUBLICATIONS

U.S. Appl. No. 14/170,508, filed Jan. 31, 2014, Office Action, mailing date Jan. 5, 2016.

U.S. Appl. No. 14/170,505, filed Jan. 31, 2014, Office Action, mailing date Nov. 20, 2015.

U.S. Appl. No. 14/074,507, filed Nov. 7, 2013, Office Action, mailing date Jan. 15, 2016.

* cited by examiner

ELECTRONIC DOCUMENT RETRIEVAL AND REPORTING USING PRE-SPECIFIED WORD/OPERATOR COMBINATIONS

FIELD

Embodiments relate generally to an approach for providing electronic document retrieval and reporting.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Current approaches for retrieving electronic documents from databases have significant limitations. One problem is that users are required to have specific knowledge and experience in constructing queries, for example, using a structure query language, which many users do not have. In addition, many database management systems offer limited reporting functionality, all of which can lead to an unsatisfactory user experience.

SUMMARY

An approach is provided for processing application forms. An application form processing service executing on a network device receives, over one or more communications networks from a scanning device, scanned document data that represents a plurality of education application forms scanned by the scanning device. The application form processing service causes the scanned document data to be processed to identify application form data contained in the plurality of education application forms scanned by the scanning device. The application form data includes one or more application form fields contained in the plurality of education application forms. The application form processing service causes the application form data to be stored in a database management system and the application form processing service causes at least a portion of the application form data to be provided to the client device.

BRIEF DESCRIPTION OF THE DRAWINGS

In the figures of the accompanying drawings like reference numerals refer to similar elements.

FIG. 2A depicts an example user interface generated by a Web interface that provides an administrator portal that allows an administrator to manage users and user access rights.

FIG. 2C depicts an example user interface that allows an administrative user to manage logs that track user activity.

FIG. 4 depicts an example user interface that allows a user to construct and submit for processing, queries for electronic documents.

FIG. 5A depicts an example user interface that allows a user to construct and submit for processing, complex queries for electronic documents.

FIG. 5B depicts a user interface with the Boolean clause definition and proximity clause definition options from Boolean clause/proximity clause/keyword phrase controls expanded.

FIG. 5C depicts a second set of Boolean operator controls that allow a user to specify how a keyword phrase definition, defined by keyword phrase definition controls, will be combined in the complex query with a Boolean clause, defined via Boolean clause definition controls, and a proximity clause, defined by proximity clause definition controls.

FIG. 5D depicts user interface after a user has entered a keyword via keyword phrase definition controls.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
II. ELECTRONIC DOCUMENT MANAGEMENT ARCHITECTURE
  A. Electronic Document Management System
  B. Client Device
  C. Web Application
III. USER ADMINISTRATION AND LOGGING IV. ELECTRONIC DOCUMENT RETRIEVAL
   A. Simple Search
   B. Advanced Search
   C. Semantic Meanings
V. REPORTING
   A. Reporting Functionality
   B. Semantic Meanings and Process Cost Estimation
VI. IMPLEMENTATION MECHANISMS I. Overview An approach is provided for retrieving electronic documents. The approach provides a Web-based graphical user interface that allows users to construct complex queries that include Boolean clauses, proximity clauses and/or keyword phrases, without requiring the users to have a working knowledge of query languages. The Web-based graphical user interface also allows users to specify a semantic meaning for one or more search terms. The approach also allows users to generate various reports for search results. Various filters may be applied to manage the amount of reporting data and semantic meanings may be applied to increase relevancy. A time cost estimator provides an estimated review time for search results. The approach provides a user friendly approach for retrieve electronic documents and performing reporting.

II. Electronic Document Management Architecture

Figure 1A:
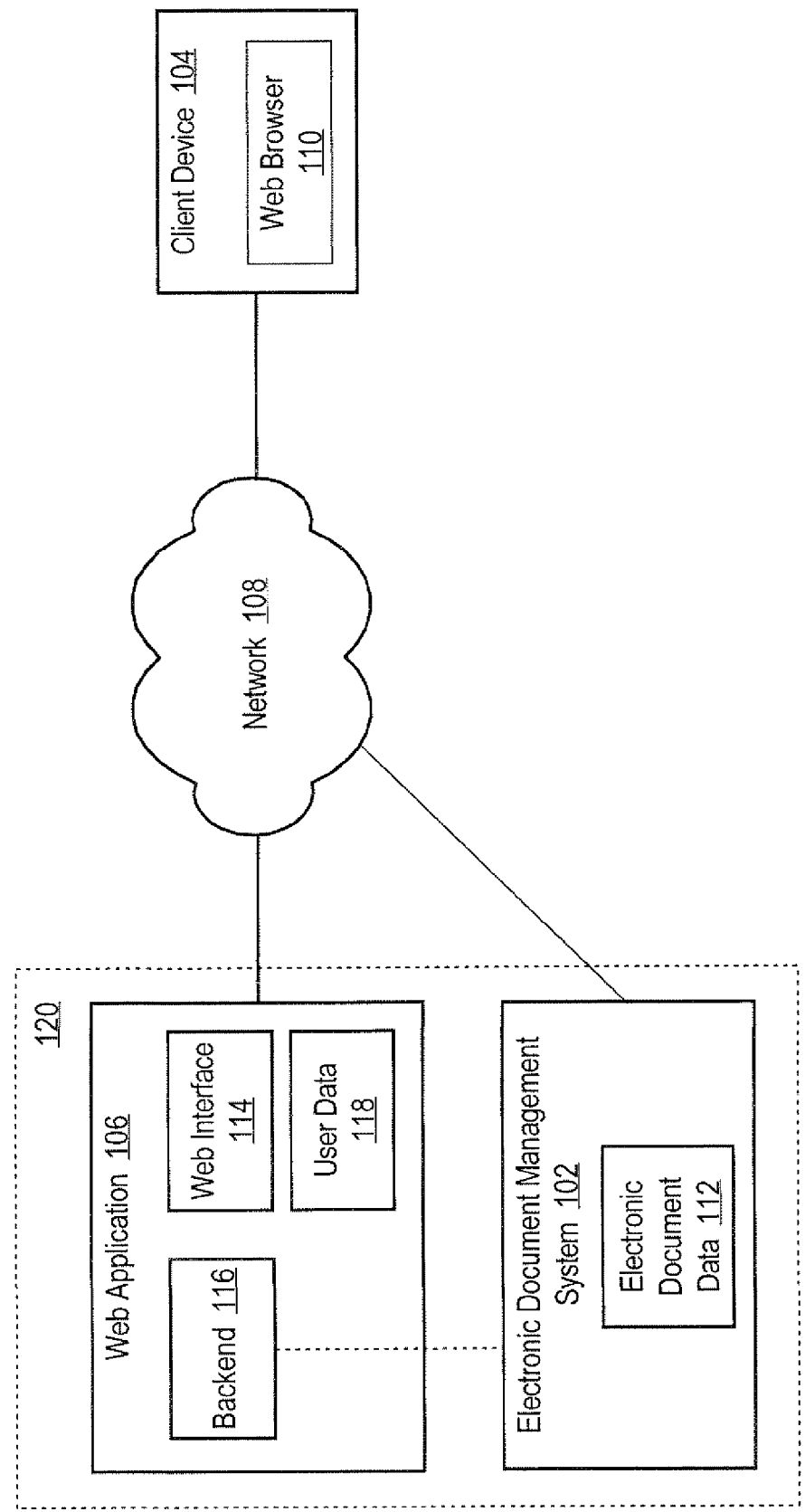
FIG. 1A is a block diagram that depicts an example arrangement for managing electronic documents.

FIG. 1A is a block diagram that depicts an example arrangement 100 for managing electronic documents. Embodiments are not limited to the example arrangement 100 depicted in FIG. 1A and other example arrangements are described hereinafter. In the example depicted in FIG. 1A, arrangement 100 includes an electronic document management system 102, a client device 104 and a Web application 106 communicatively coupled via a network 108. Network 108 may include any number of network connections, for example, one or more Local Area Networks (LANs), Wide Area Networks (WANs), Ethernet networks or the Internet, and/or one or more terrestrial, satellite or wireless links. The elements depicted in arrangement 100 may also have direct communications links, the types and configurations of which may vary depending upon a particular implementation.

A. Electronic Document Management System

Electronic document management system 102 may be implemented by hardware, computer software, or any combination of hardware and computer software for managing electronic documents. One non-limiting example implementation of electronic document management system 102 is a database management system and may include applications, such as those offered by Nuix North America, Inc. Electronic document management system 102 stores electronic document data 112 that may be any type of electronic document data in any form, including structured data and unstructured data. Examples of electronic document data 112 include, without limitation, word processing documents, spreadsheet documents, source code files, etc.

B. Client Device

Client device 104 may be any type of client device, depending upon the particular implementation. Example client devices include, without limitation, personal or laptop computers, workstations, tablet computers, personal digital assistants (PDAs) and telephony devices such as smart phones. Client device 104 may include applications including, for example, a Web browser 110 and other client-side applications. Client device 104 may include other elements, such as a user interface, one or more processors and memory, including volatile memory and non-volatile memory.

C. Web Application

Web application 106 includes a Web interface 114 and a backend 116 that provide access to electronic document data 112 stored on electronic document management system 102. Web interface 114 provides a Web-based interface, for example one or more Web pages, that can be accessed by a user of client device 104 via Web browser 110. As described in more detail hereinafter, the Web-based interface provided by Web interface 114 allows a user to construct queries and have those constructed queries processed by electronic document management system 102, for example, to search for electronic document data 112. In the arrangement 100 depicted in FIG. 1A, the constructed queries may be processed directly against electronic document data 112 via backend 116. Web application 106 may be hosted, for example, on a Web server that is not depicted in FIG. 1A for purposes of explanation. User data 118 specifies privileges and access rights of users to access Web application 106 and electronic document data 112. User data 118 is depicted in FIG. 1A as being part of Web application 106 but this is not required and user data 118 may be stored external to Web application 106 and accessed by Web application 106 via network 108.

Figure 1B:
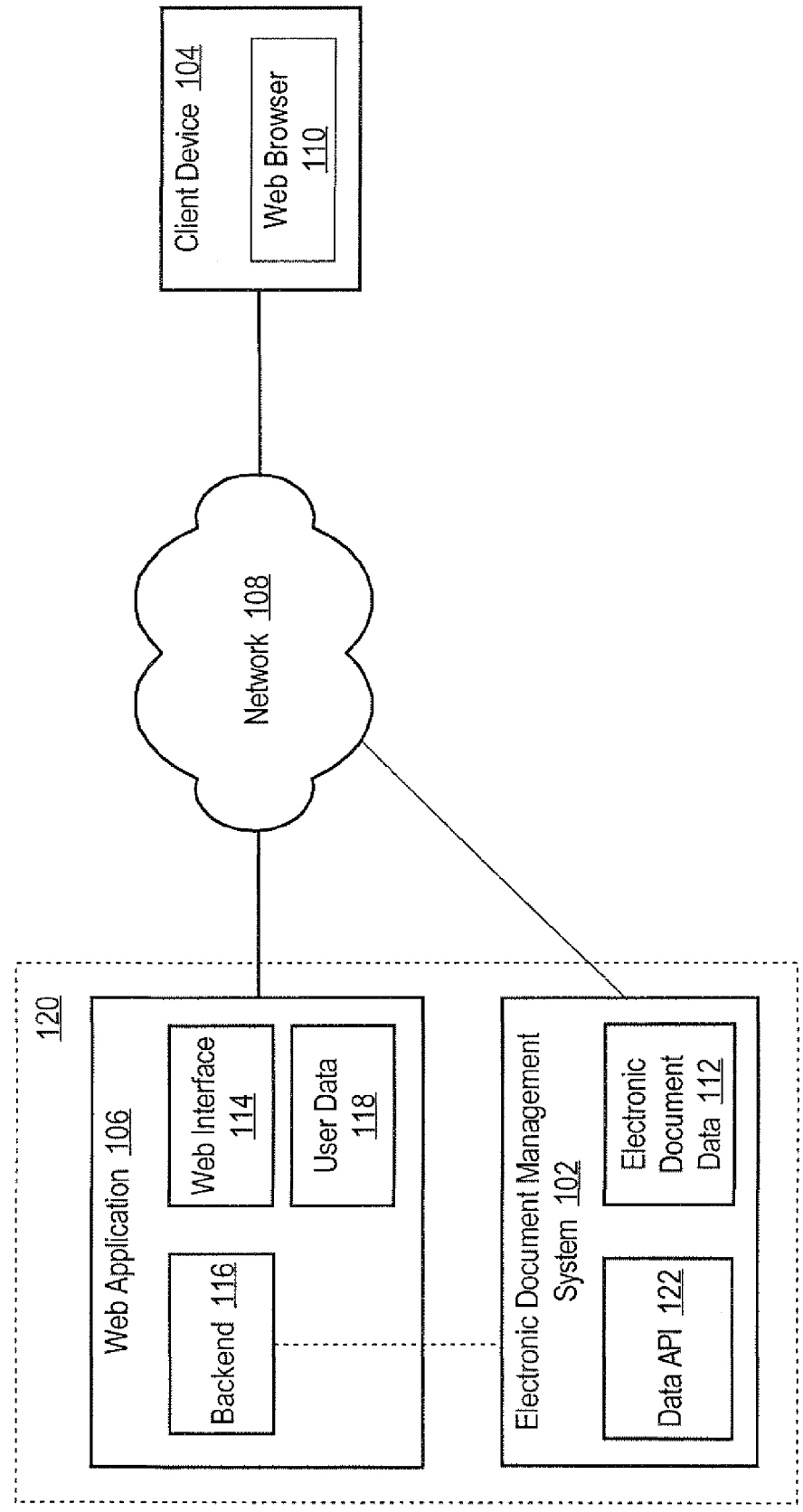
FIG. 1B depicts that a document management system may include a data Application Program Interface (API) that provides access to electronic document data on the electronic document management system.

As depicted in FIG. 1B, electronic document management system 102 may include a data Application Program Interface (API) 122 that provides access to electronic document data 112 on electronic document management system 102. In this example arrangement 100, access to electronic document data 112 is provided via backend 116 and data API 122.

Figure 1C:
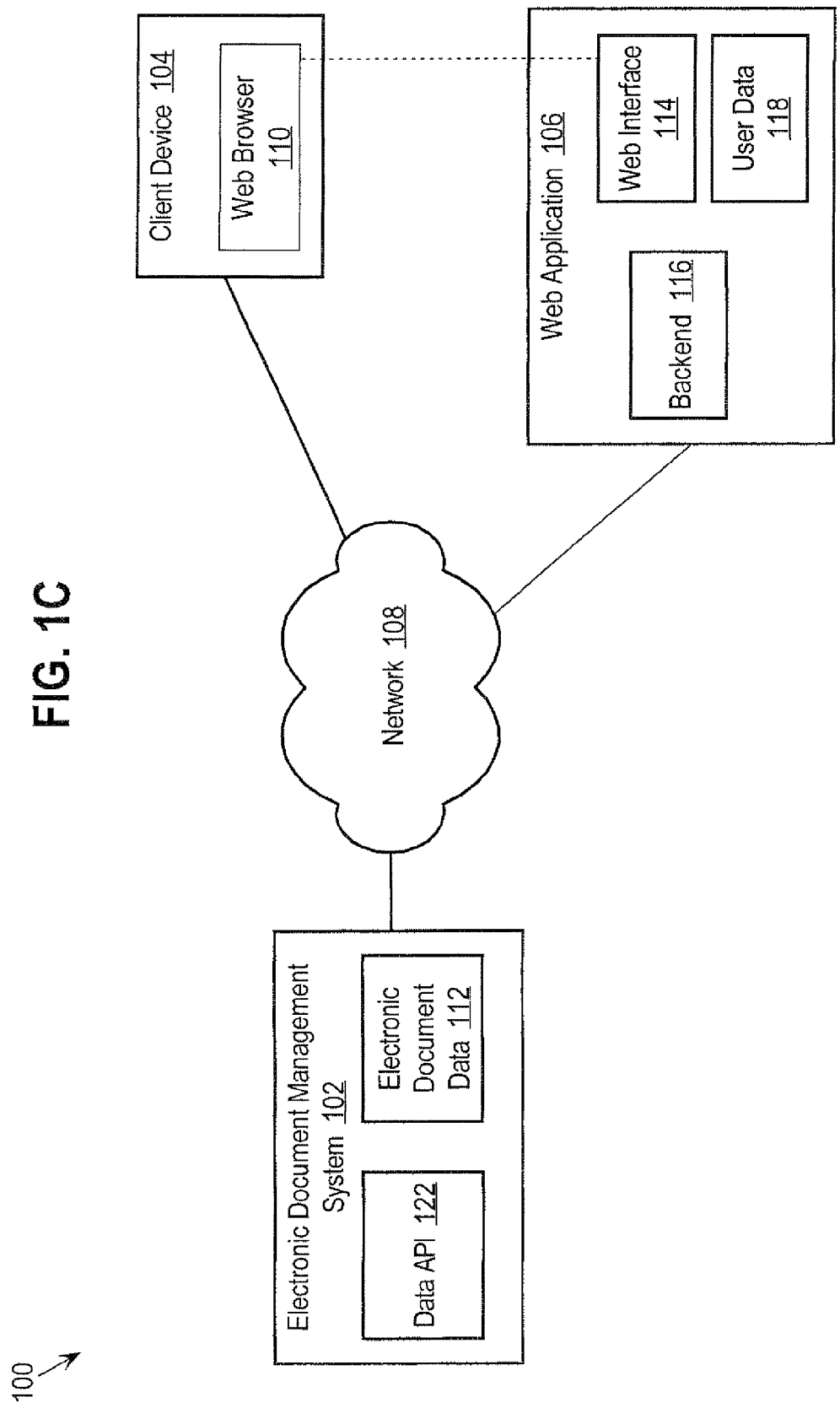
FIG. 1C depicts arrangement in which electronic document management system is implemented separate from a Web application.

As depicted in FIGS. 1A and 1B, Web application 106 and electronic document management system 102 may be hosted on a host system 120, for example a network element such as a server. Embodiments are not limited to electronic document management system 102 and Web application 106 being implemented on a common host 120 however, and electronic document management system 102 and Web application 106 may be implemented separately on different network elements. FIG. 1C depicts arrangement 100 in which electronic document management system 102 is implemented separate from Web application 106. In this example, a user of client device 104 uses Web browser 110 to access Web application 106 via Web interface 114 to construct and submit queries to electronic document management system 102 via backend 116 and data API 122.

III. User Administration and Logging

Figure 2A:
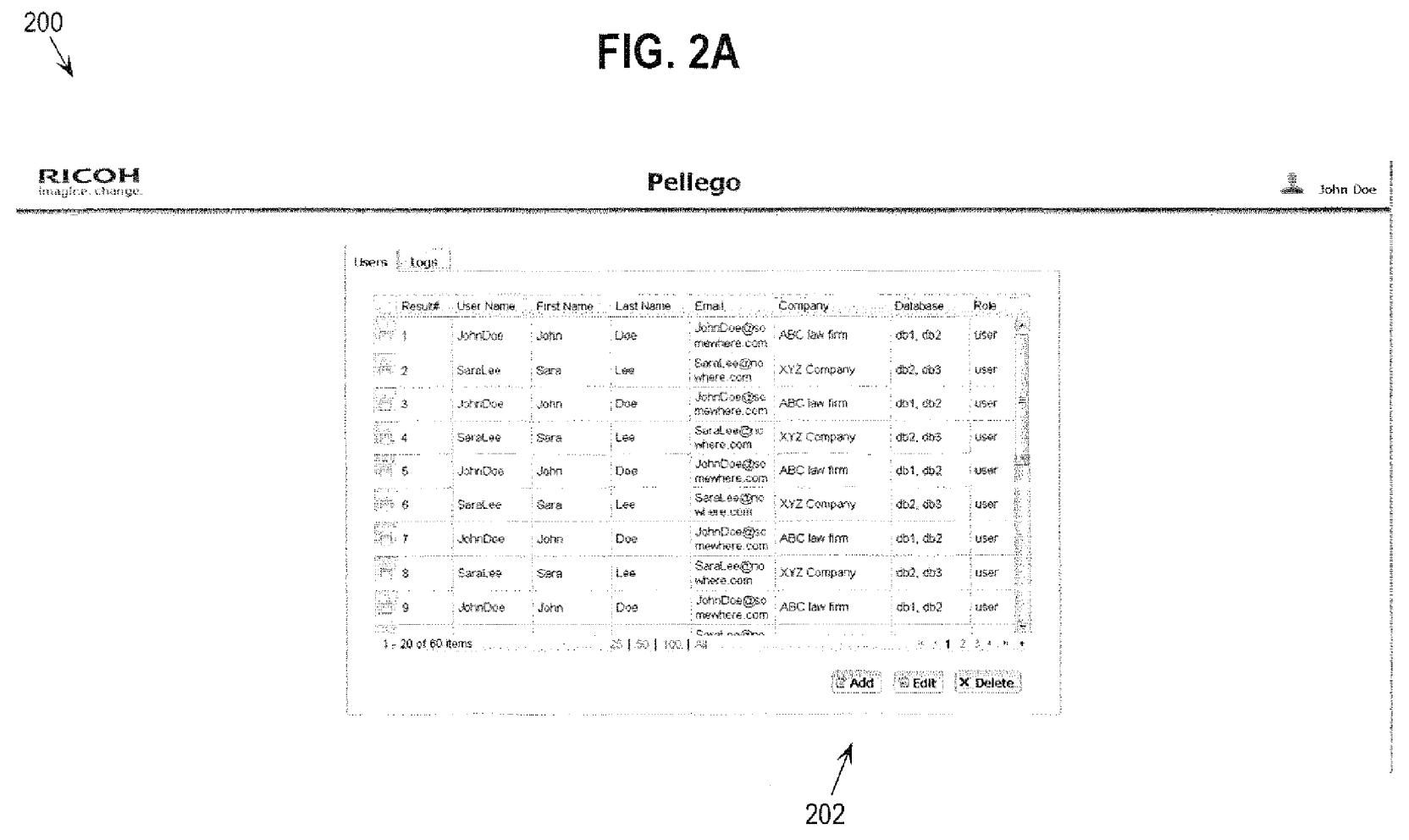

According to one embodiment, Web application 106 is configured to provide different types of administrative user functionality and end user functionality. The particular functionality provided by Web application 106 may vary depending upon a particular implementation and embodiments are not limited to Web application 106 providing particular functionality. FIG. 2A depicts an example user interface 200 generated by Web interface 114 that provides an administrator portal that allows an administrator to manage users and user access rights. The first row of the table depicted in FIG. 2A specifies, for a user named "John Doe", contact information including first and last name and email address, a company affiliation, databases that the user may access and a role for the user. In this example, the databases "db1" and "db2" may be maintained by electronic document management system 102. Although embodiments are described herein in the context of providing user access to databases, embodiments are not limited to databases and are applicable to any form of organized data, such as tables, files, data collections, etc. Example values for the Role attribute include "user" and "admin" and specifying a Role attribute of "admin" may provide access to additional permissions and access rights not depicted in FIG. 2A. User interface 200 includes a set of controls 204 that allow an administrator to add, edit and delete users.

Figure 2B:
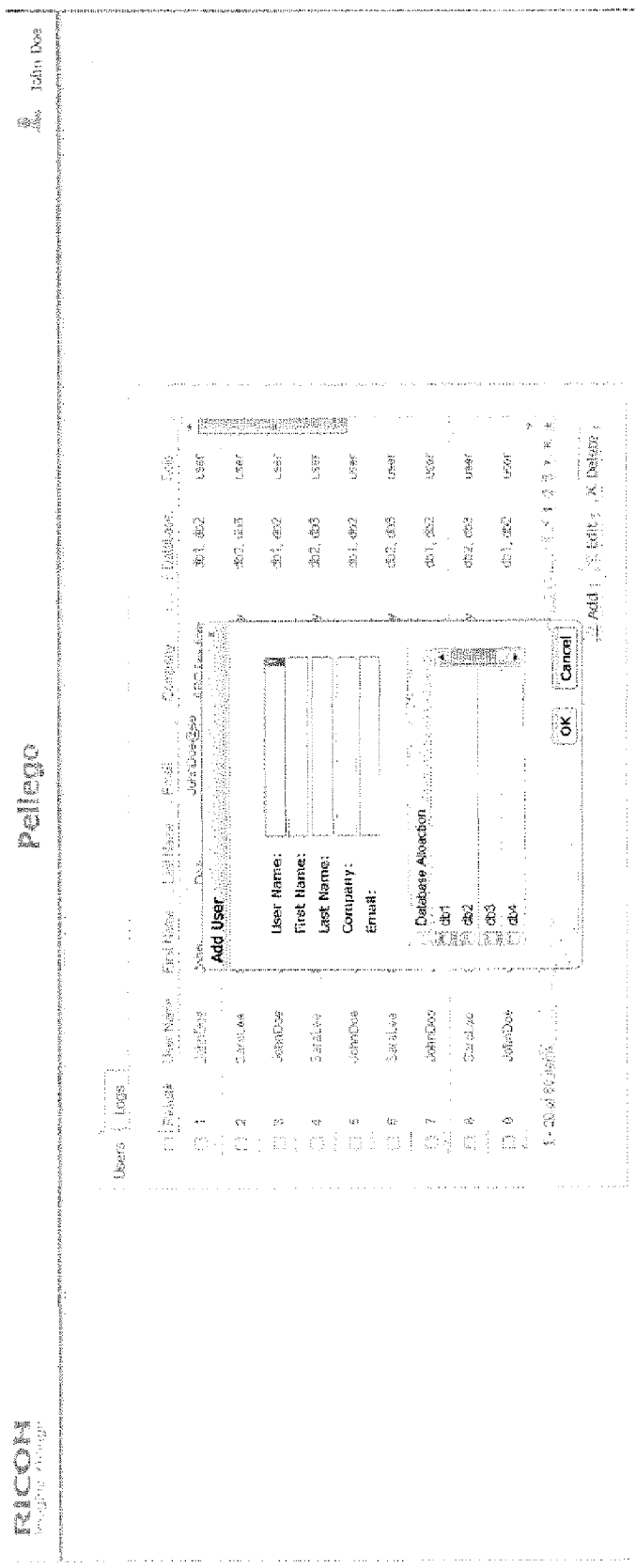
FIG. 2B depicts an example user interface generated by a Web interface after an administrative user has selected to add a new user by selecting the "Add" control from controls depicted in FIG. 2A.

FIG. 2B depicts an example user interface 200 generated by Web interface 114 after an administrative user has selected to add a new user by selecting the "Add" control from controls 202 depicted in FIG. 2A. User interface 200 allows an administrative user to specify, for the new user, a user name, first name, last name, company affiliation and email address. User interface 200 also allows the administrative user to specify databases that the new user is authorized to access.

Figure 2C:
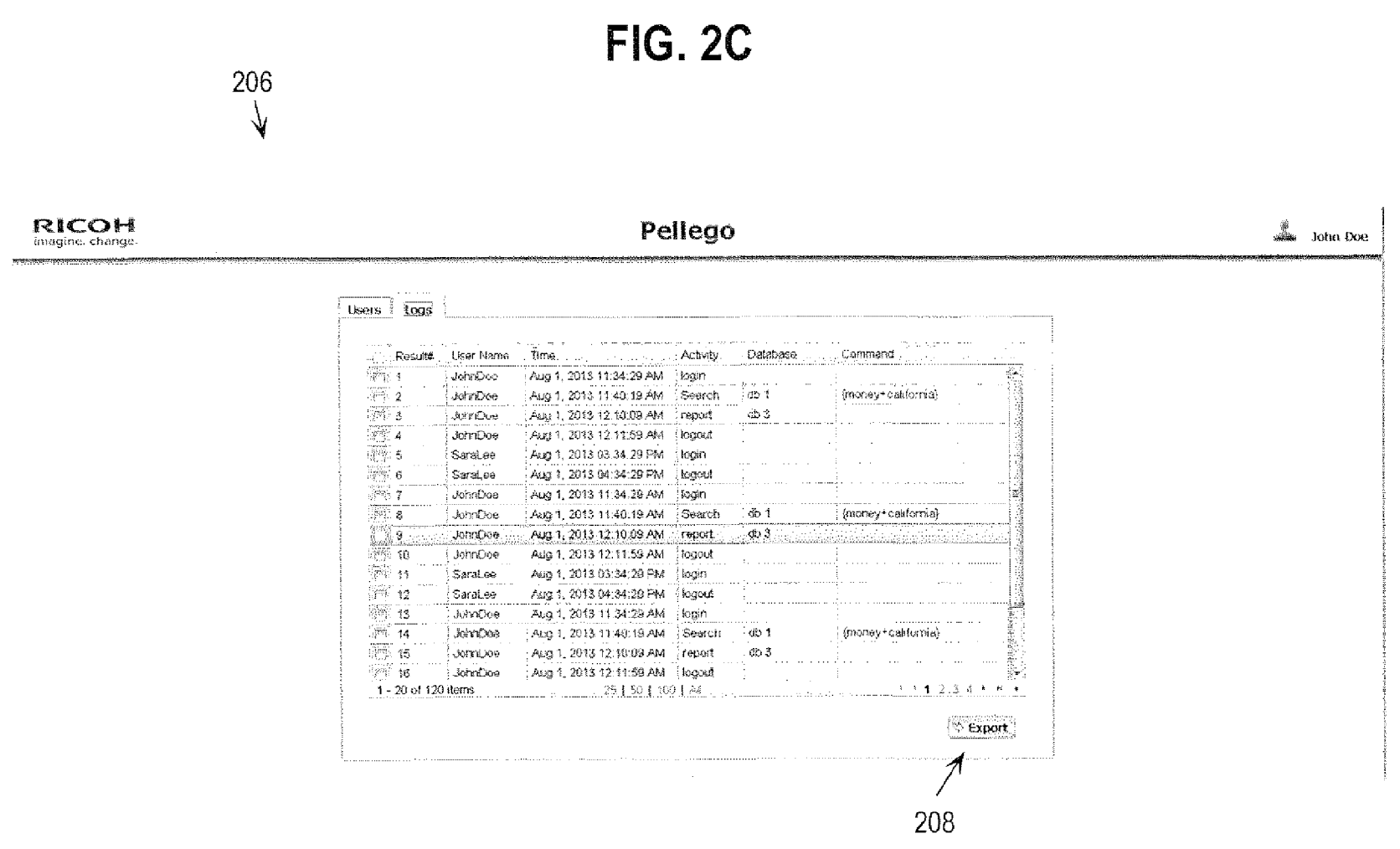

FIG. 2C depicts an example user interface 206 that allows an administrative user to manage logs that track user activity. In the example depicted in FIG. 2C, each row tracks a particular activity that was performed, including the username, the date and time, a type of activity, the data that was accessed, such as a database, and a command that was executed against the data. The logging of user activity may be useful, for example, for auditing purposes. This example also includes a control 208 for exporting log data, for example to a file.

Figure 3:
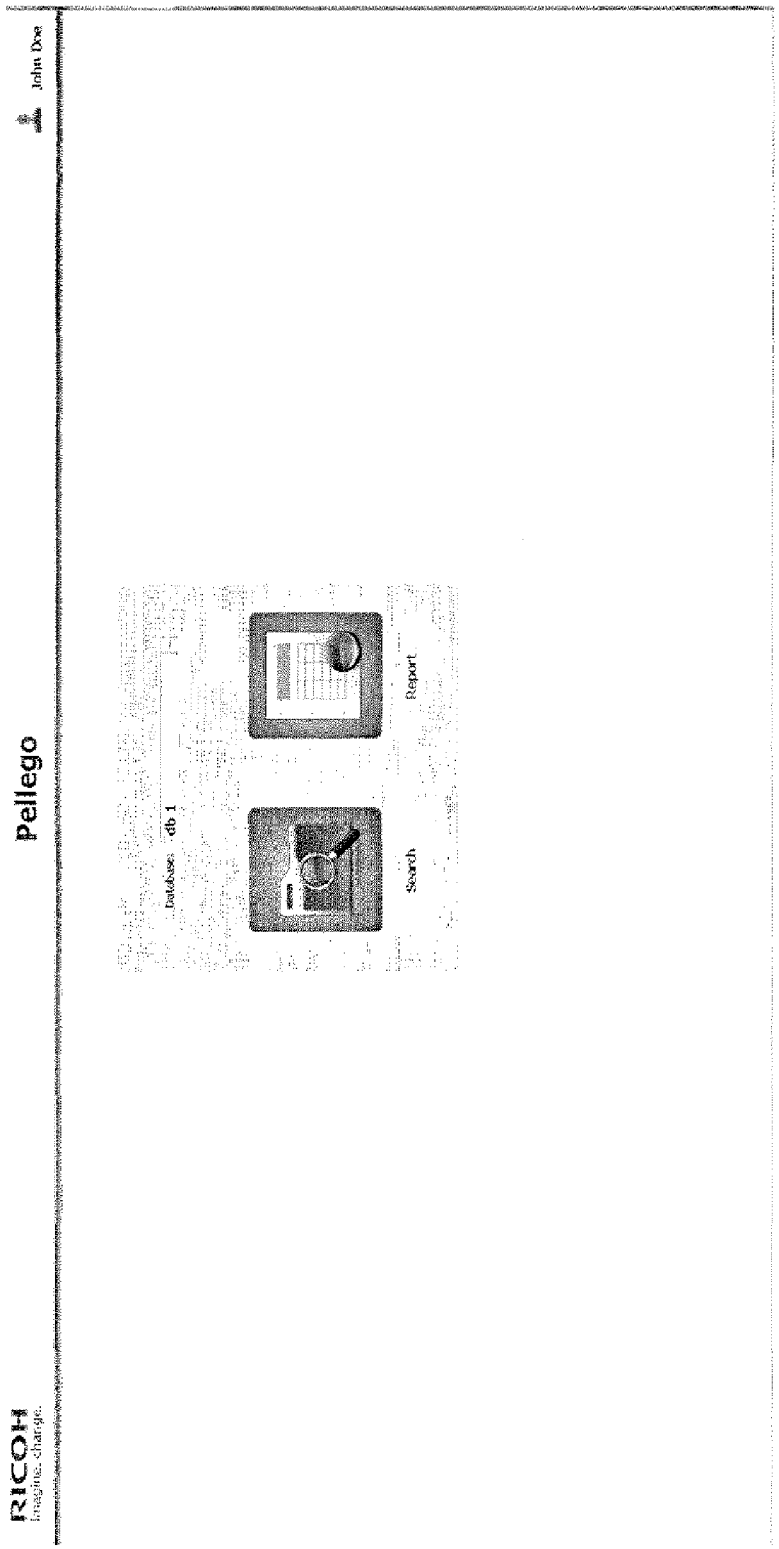
FIG. 3 depicts an example user interface that allows a user to select a particular data set and then select to either search the selected data set or generate a report based upon the selected data set.

FIG. 3 depicts an example user interface 300 that allows a user to select a particular data set, such as a database as depicted in FIG. 3, and then select to either search the selected data set or generate a report based upon the selected data set.

IV. Electronic Document Retrieval

A. Simple Search

The approach described herein provides a user interface and system that allows a user to construct and submit queries for processing against a data collection. According to one embodiment, the user interface is provided by one or more Web pages generated by Web interface 114 that are provided upon request to Web browser 110. The processing of the Web pages provides the Web-based user interface.

Figure 4:
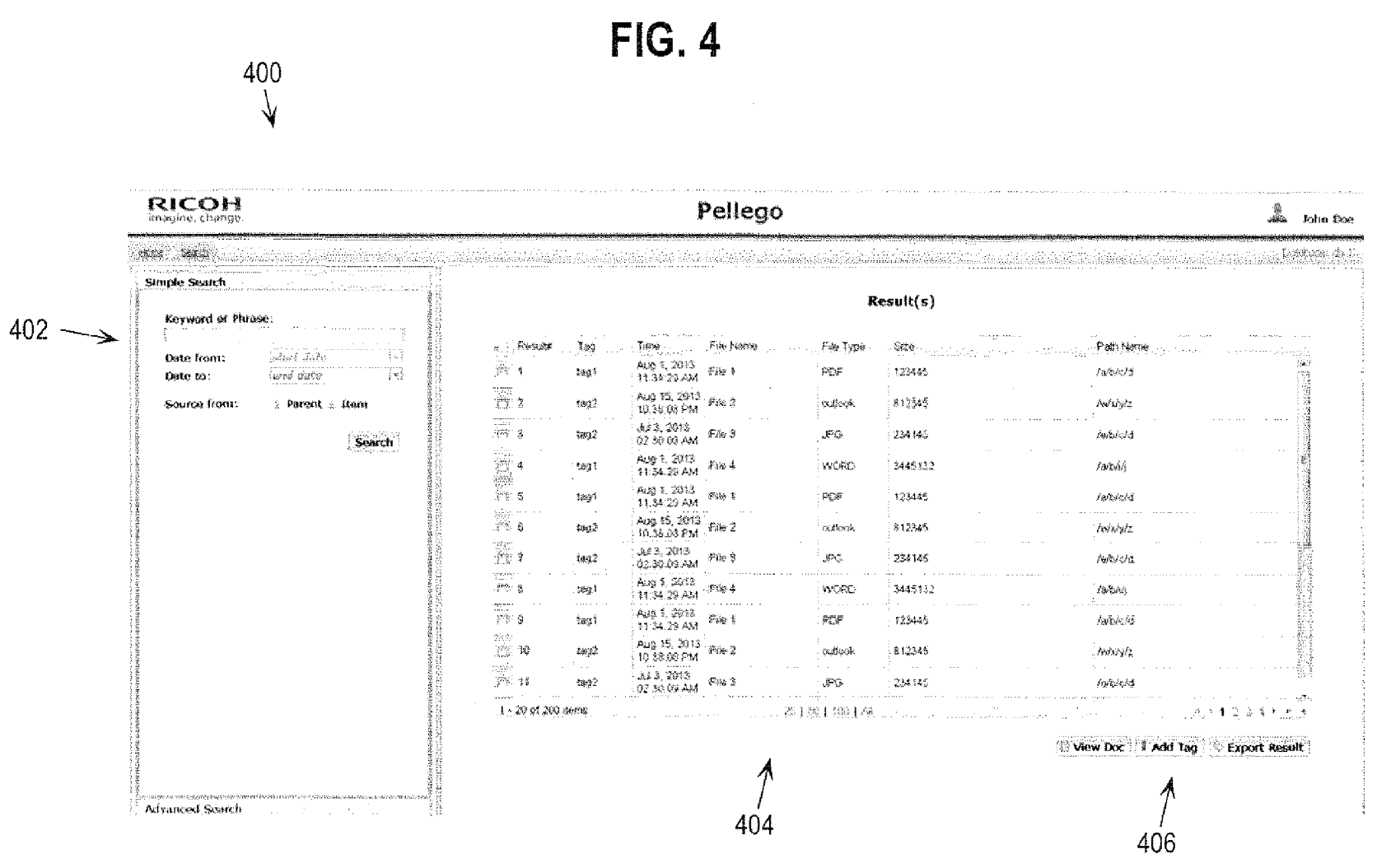

FIG. 4 depicts an example user interface 400 that allows a user to construct and submit for processing, queries for electronic documents. The example user interface 400 depicted in FIG. 4 includes user interface controls 402 for constructing a simple search query. In this example, the controls 402 allow a user to specify one or more keywords or phrases, a starting and ending date, and source of data from either a parent, such as an email, or an item, such as an attachment. Thus, the query may include keywords and phrases, as well as other criteria specified by the user, but the user is not burdened with having to actually write queries, for example, using a structured query language. User interface 400 also includes a results area 404 that displays results of electronic document management system 102 processing the query against electronic document data 112. The table of data displayed in results area 404 may be active, meaning that a user may select columns to cause the data in the results area to be sorted by the selected column. For example, a user may select the "File Name" column to cause the results in results area 404 to be sorted by file name. A user may select one or more result items displayed in results area 404 and then use controls 406 to perform actions on the selected result items. For example, a user may use controls 406 to view a particular electronic document, add a tag to an electronic document or export an electronic document. Selecting the "Add Tag" option allows a user to specify metadata for a search result, for example, via a data entry field that is displayed in response to a user selecting the "Add Tag" option. The metadata may include any type of data. Examples of metadata include, without limitation, notes or comments, categories, topics, subjects, classifications, types, ratings, rankings, indications of relevance, etc. Tag data, i.e., metadata, may be stored by electronic document system 102, either separate from or together with electronic document data 112. Either the tag data itself, or separate data, such as mapping data, may indicate relationships between tag data and electronic document data 112. Tag data may be searchable and according to one embodiment, keywords or phrases included in search queries are processed both against electronic document data 112 and tag data associated with the electronic document data 112.

B. Advanced Search

The approach described herein provides a user interface and system that allows a user to perform an advanced search. The advanced search option allows a user to easily and conveniently construct complex queries and to submit those queries for processing against a data collection. According to one embodiment, a user interface for performing advanced searches is provided by one or more Web pages generated by Web interface 114 that are provided upon request to Web browser 110. The processing of the Web pages provides the Web-based user interface for performing advanced searches. The Web-based user interface allows a user to specify, for inclusion in a query, one or more custodians, file types, domains, Boolean clauses, proximity clauses, keyword phrases, or any combination thereof.

Figure 5A:
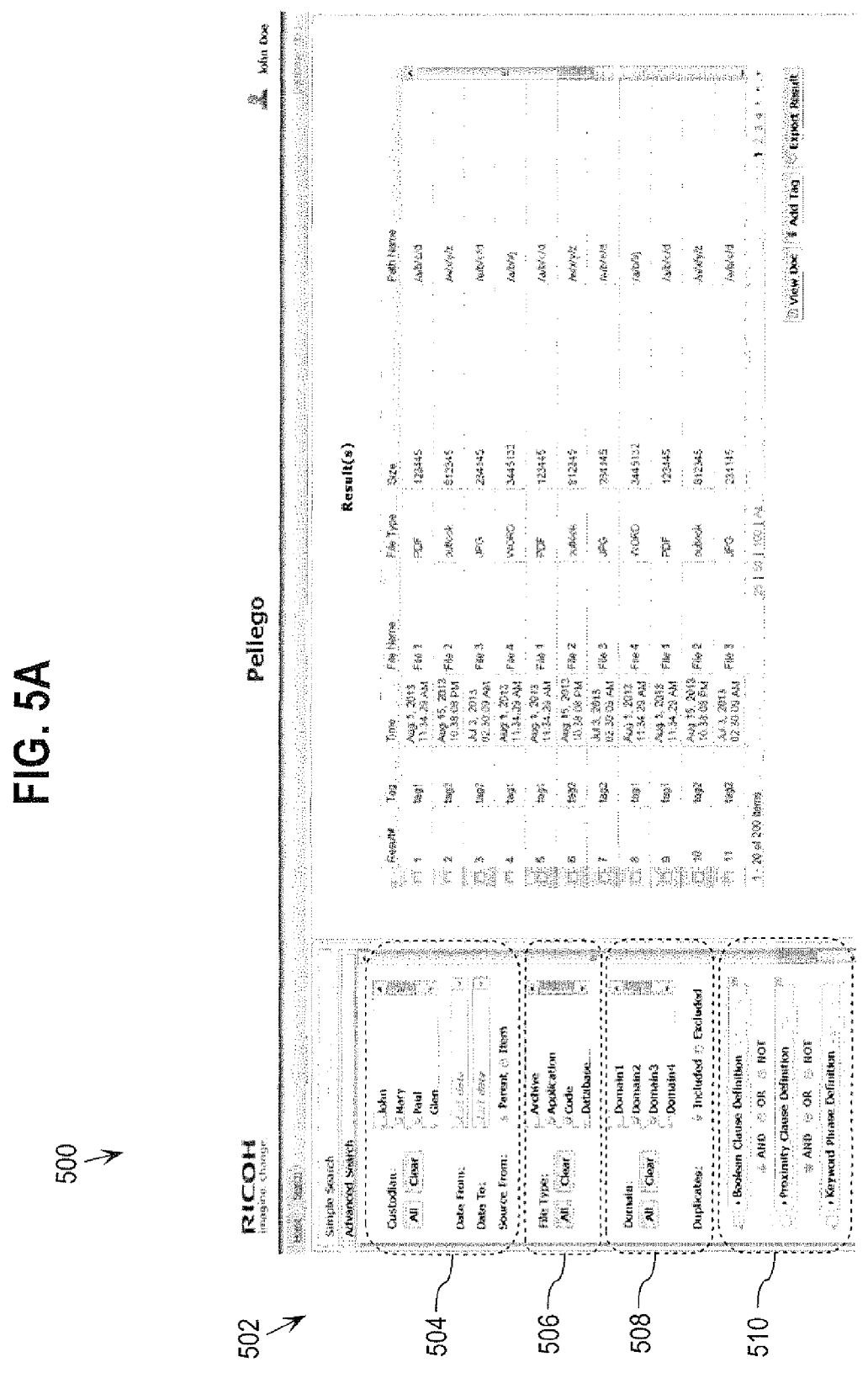

FIG. 5A depicts an example user interface 500 that allows a user to construct and submit for processing, complex queries for electronic documents. The example user interface 500 depicted in FIG. 5 includes various user controls 502 for constructing complex queries. Unlike conventional approaches that require users to have the knowledge and skill to write structured queries, the present approach allows user to construct complex queries by selecting graphical user interface objects that correspond to search constructors, which provides a far more user-friendly experience.

In the example depicted in FIG. 5A, controls 502 include custodian controls 504, file type controls 506, domain controls 508 and Boolean clause/proximity clause/keyword phrase controls 510. Fewer or additional controls may be made available to users depending upon a particular implementation and embodiments are not limited to a user interface with a particular set of controls.

Custodian controls 504 allow a user to select one or more custodians, a date range and a data source. A custodian is a user assigned to data and assignments of users to data may be established, for example, by administrative personnel. In the present example, the source of data may be either a parent, such as an email, an item, such as an attachment, or both a parent and an item.

File type controls 506 allow a user to specify one or more file types, for example, archive, application, code or database file types. Any number and types of file types may be used, depending upon a particular implementation, and embodiments are not limited to any particular file types.

Domain controls 508 allow a user to specify one or more domains, including all domains. A domain is a portion of searchable data. One non-limiting example of a domain is a logical data domain. Logical data domains are useful in a variety of contexts. For example, a business organization may define a set of logical domains, where each logical domain corresponds to a group, project, user or group of users within the business organization. Another non-limiting example of a domain is an email domain. Different domains may share some data items in common, so domain controls 508 include controls for including or excluding duplicates, i.e., data items that are included in more than one domain.

Figure 5B:
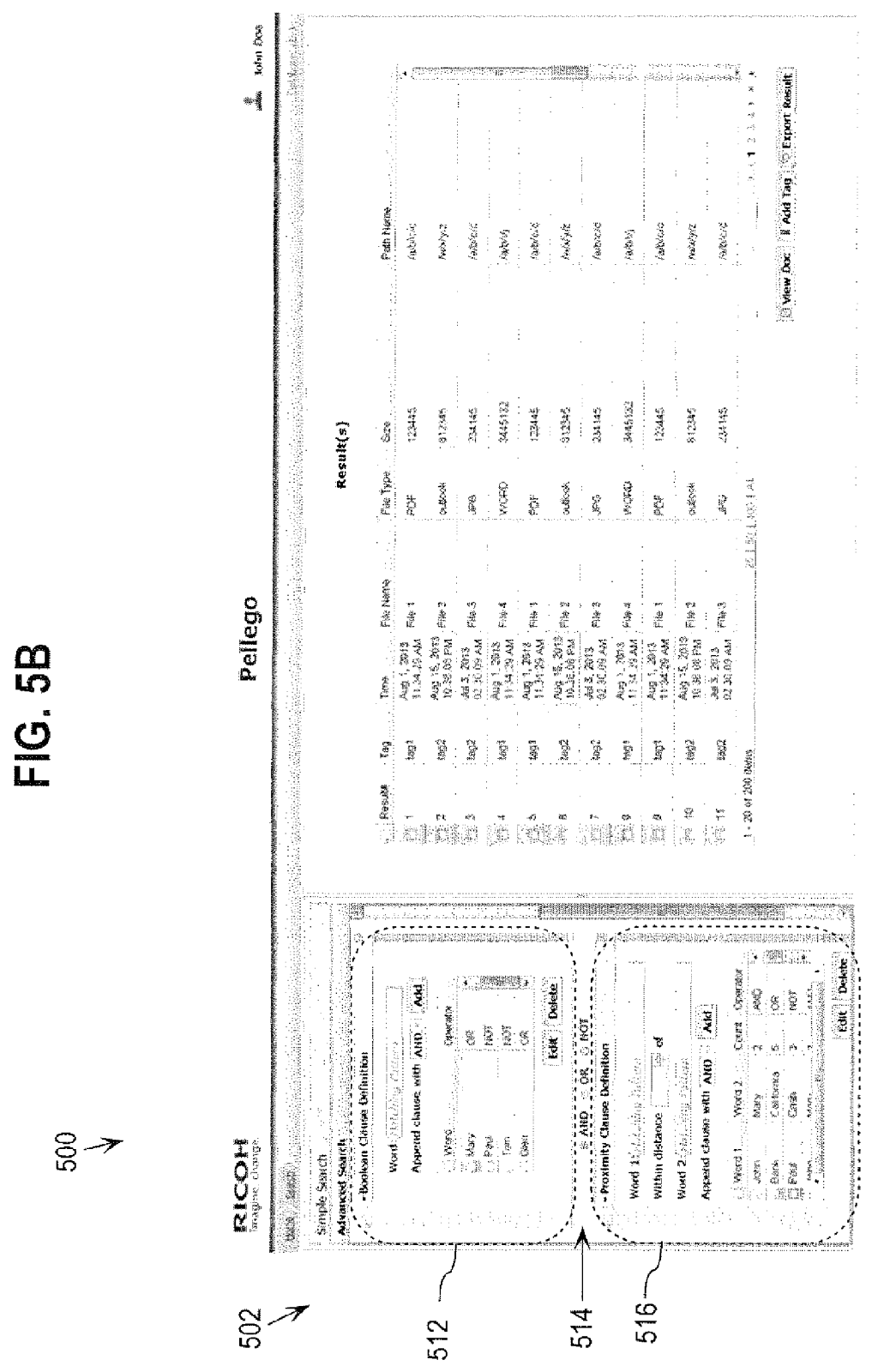

Boolean clause/proximity clause/keyword phrase controls 510 allow a user to specify, using checkboxes, additional criteria to be applied to the advanced search and relationships between those criteria. In the present example, the additional criteria include a Boolean clause, a proximity clause and a keyword phrase. These additional criteria may be selected either individually or in any combination for inclusion in the advanced search. Boolean clause/proximity clause/keyword phrase controls 510 include graphical user interface objects in the form of arrows that allow a user to reveal and hide details for defining Boolean clauses, proximity clauses and keyword phrases. In addition, operators "AND", "OR" and "NOT" may be selected to indicate how the selected Boolean clauses, proximity clauses and keyword phrases are to be used together in the complex query. For example, a user may select to include in the complex query, both a Boolean clause and a proximity clause. The user may also select the "AND" operator to indicate that the search results must satisfy both the Boolean clause and the proximity clause, as further specified as depicted in FIG. 5B hereinafter. Alternatively, the user may select the "OR" operator to indicate that the search results must satisfy either the Boolean clause or the proximity clause, as further specified as depicted in FIG. 5B hereinafter. The "NOT" operator may be selected to add a requirement that search results not include a particular Boolean clause, proximity clause or keyword phrase.

FIG. 5B depicts the user interface 500 with the Boolean clause definition and proximity clause definition options from Boolean clause/proximity clause/keyword phrase controls 510 expanded. Boolean clause definition controls 512 allow a user to define a Boolean clause to be included in an advanced search query by selecting word/operator combinations from a list. For example, a user may select the word/operator combination "Mary/OR" and "Paul/NOT" and the resulting complex query will require that search results include either "Mary" or "Paul". As another example, a user may select the word/operator combination "Mary/OR" and "Paul/NOT" and "Tom/NOT" and the resulting complex query will require that search results include either "Mary" or "Paul" and not "Tom". The Boolean clause definition controls 512 provide a user-friendly approach for users to construct complex queries.

The word/operator combinations that are available in Boolean clause definition controls 512 may be specified by a user, such as an administrator. For example, an administrator may define a set of word/operator combinations that are likely to be of interest to users. The specified word/operator combinations may be user-specific and/or associated with other logical entities, such as groups within a business organization. For example, a set of word/operator combinations may be specified for a particular group of users within a business organization. Although embodiments are depicted in the figures and described herein in the context of word/operator combinations having a one word and one operator, embodiments are not limited to these examples and word/operator combinations may have multiple words and operators. Boolean clause definition controls 512 also allow users to add, edit or delete word/operator combinations by selecting corresponding controls within Boolean clause definition controls 512. This allows users to customize the word/operator combinations made available via Boolean clause definition controls 512. The order in which word/operator combinations are displayed in Boolean clause definition controls 512 may be based upon a wide variety of criteria that may vary depending upon a particular implementation. For example, the order of word/operator combinations may be random, based upon an order in which the word/operator combinations were created, or based upon an order manually specified by a user, such as an administrator.

A first set of Boolean operator controls 514 allows a user to specify how a Boolean clause, defined via Boolean clause definition controls 512, and a proximity clause, defined by proximity clause definition controls 516 will be combined in the complex query.

Proximity clause definition controls 516 allow a user to define a proximity clause to be included an in an advanced search query by selecting one or more word/distance/operator combinations from a list of word/distance/operator combinations. Each word/distance/operator combination includes two search terms, in the form of words, a distance that is identified in the figures by the term "count", and an operator. When a particular word/distance/operator combination is selected, corresponding search attributes are added to the advanced search query and search results must include the two search terms within the specified distance. The distance may be applied on a word-by-word basis, a paragraph-by-paragraph basis, or on other bases, depending upon a particular implementation. For example, suppose that a user selects the first word/distance/operator combination ("John" "Mary" "2" "AND") in the list of proximity clause definition controls 516. Suppose further that the units of distance are words. When this word/distance/operator combination is included in a query, search results must include the term "John" within two words of the term "Mary". As another example, if the units of distance are paragraphs, then search results must include the term "John" within two paragraphs of the term "Mary". The operator "AND" is used to combine the word/distance/operator combination with other search terms, for example with a keyword phrase definition as described hereinafter, and/or other word/distance/operator combinations. For example, suppose that a user selects both the first word/distance/operator combination ("John" "Mary" "2" "AND") and the second word/distance/operator combination ("Bank" "California" "5" "OR") in the list of proximity clause definition controls 516. Suppose further that the units of distance are words. In this situation, the search results must include the term "John" within two words of the term "Mary" and must also include the term "Bank" within five words of the term "California".

As with the word/operator combinations that are available via the Boolean clause definition controls 512, the word/distance/operator combinations available via the proximity clause definition controls 516 may be specified by a user, such as an administrator. For example, an administrator may define a set of word/distance/operator combinations that are likely to be of interest to users. The specified word/distance/operator combinations may be user-specific and/or associated with other logical entities, such as groups within a business organization. For example, a set of word/distance/operator combinations may be specified for a particular group of users within a business organization. In addition, although embodiments are depicted in the figures and described herein in the context of word/distance/operator combinations having a one word and one operator, embodiments are not limited to these examples and word/distance/operator combinations may have multiple words and operators.

Proximity clause definition controls 516 also allow users to add, edit or delete word/distance/operator combinations by selecting corresponding controls within proximity definition controls 516. This allows users to customize the word/distance/operator combinations made available via proximity clause definition controls 516.

Figure 5C:
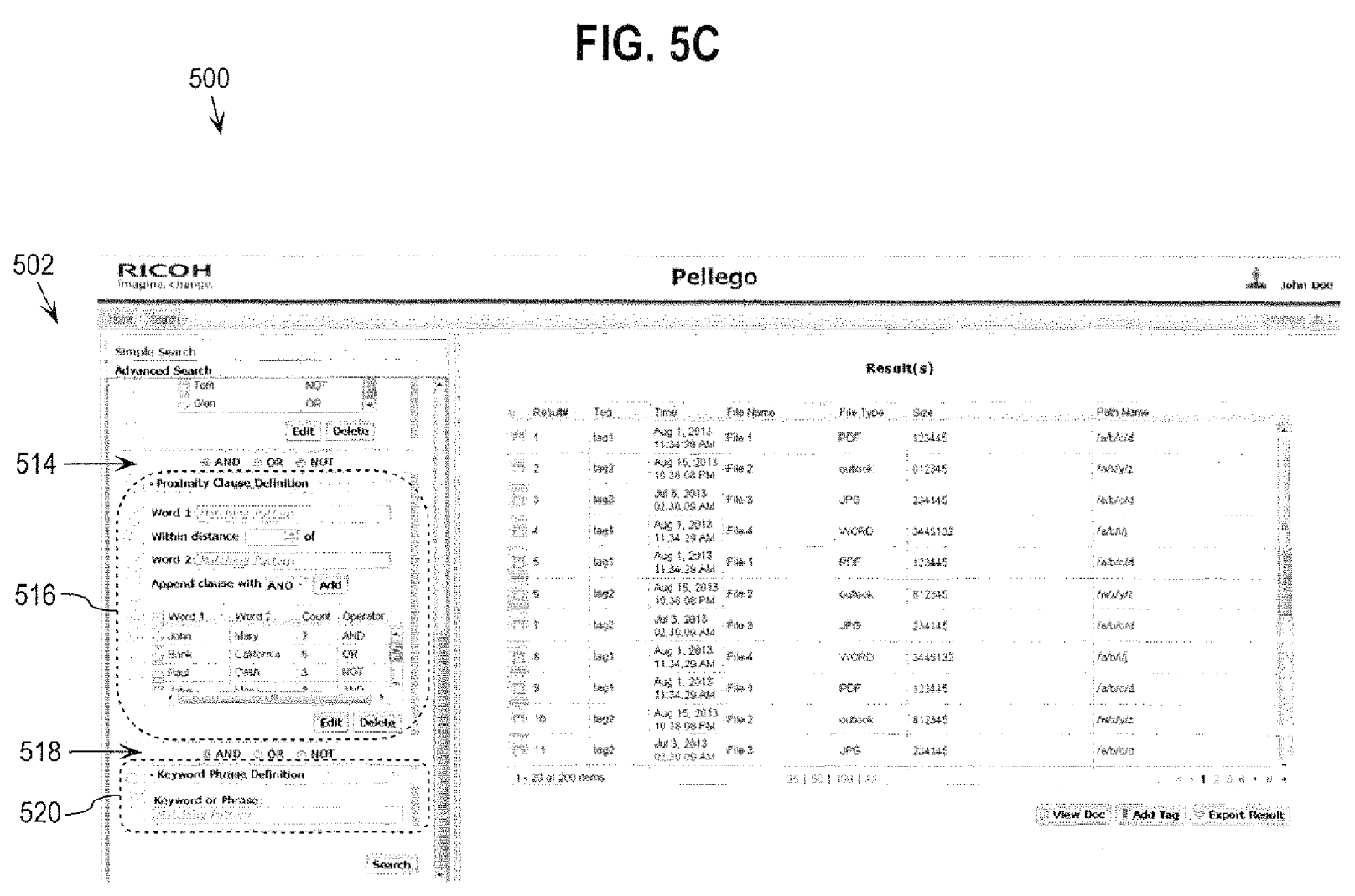

As depicted in FIG. 5C, a second set of Boolean operator controls 518 allows a user to specify how a keyword phrase definition, defined by keyword phrase definition controls 520, will be combined in the complex query with a Boolean clause, defined via Boolean clause definition controls 512, and a proximity clause, defined by proximity clause definition controls 516. Keyword phrase definition controls 520 allow a user to specify one or more keywords and/or phrases that are to be included in and used as search query terms in a complex query. For example, a user may choose to specify a particular keyword to be included in the complex query by selecting the "AND" operator from the second set of Boolean operator controls 518. The particular keyword may be related to a particular context that the user believes to be relevant for the search. In this example, the search results must include the particular keyword since the "AND" operator was selected from the second set of Boolean operator controls 518.

C. Semantic Meanings

Figure 5D:
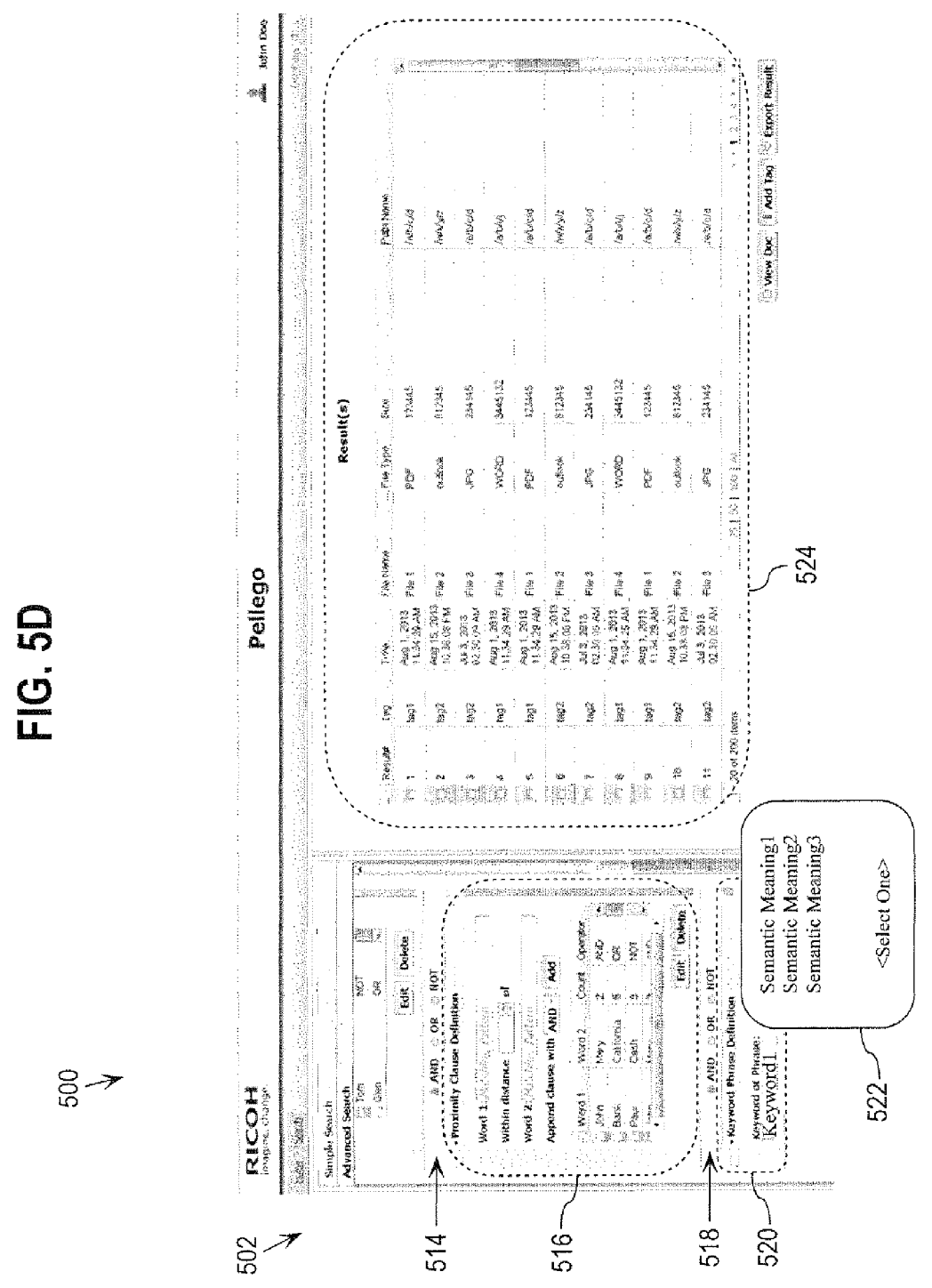

Keywords and phrases used in search queries may have different semantic meanings that can reduce the relevancy of search results. According to an embodiment, an option is provided that allows users to specify or select a semantic meaning for keywords and phrases used in search queries. FIG. 5D depicts user interface 500 after a user has entered, via keyword phrase definition controls 520, a keyword "Keyword1" to be included in a complex query. A semantic meaning box 522 is displayed that identifies different semantic meanings for the keyword "Keyword1". In this example, three semantic meanings are displayed, identified as "Semantic Meaning1", "Semantic Meaning2" and "Semantic Meaning3". The semantic meanings may be retrieved from a database of keywords and corresponding semantic meanings. The number of semantic meanings and the manner in which semantic meanings are displayed on a graphical user interface may vary depending upon a particular implementation and embodiments are not limited to any particular implementation.

The semantic meaning box 522 allows a user to select one or more of the semantic meanings for the keyword and have the complex query modified to represent the selected semantic meaning. The modification of the complex query to represent the selected semantic meaning may be performed using a wide variety of approaches that may vary depending upon a particular implementation. For example, a selected semantic meaning may be added to a complex search query. As another example, search terms or keywords that correspond to a selected semantic meaning may be added to a complex search query. This may improve the relevancy of search results because the complex search query is modified to reflect the one or more semantic meanings selected by the user.

Semantic meanings may also be used to improve the usefulness of search results. For example, in FIG. 5D, search results are presented in a results area 524. According to one embodiment, the table of search results depicted in results area 524 includes a column that indicates semantic meanings for the search results. This may improve the relevancy of the search results and the user experience for a user. For example, suppose that a user constructed a complex query using the query term "Server Farm" and did not specify a semantic meaning, e.g., related to the information technology context. In this example, the search results may include results related to information technology as intended by the user. The search results may, however, include results for other contexts that are not of interest to the user, e.g., in the agriculture context.

According to one embodiment, semantic meanings may be used to organize and order search results. For example, a user selection of a graphical user interface object that corresponds to a particular semantic meaning causes the data displayed in the table to be re-ordered based upon the particular semantic meaning. This can improve the relevancy of the results and the user experience by allowing a user to re-order search results based upon a context of interest to the user. The use of semantic meanings to re-order search results may be used separately or in combination with the use of semantic meanings when constructing complex search queries. For example, in situations where a user does not specify a particular semantic meaning during construction of a complex query, then the search results may include many different semantic meanings and the use of semantic meanings to re-order search results as described herein may be very useful for improving relevancy and the user experience. In other situations where a user specifies multiple semantic meanings when constructing a complex search query, then the use of semantic meanings to re-order search results as described herein may still be very useful for improving relevancy and the user experience. Even in situations where a user specifies one or more semantic meanings when constructing a complex search query, the use of semantic meanings to re-order search results as described herein may still be helpful in situations where sub-categories of semantic meanings are applicable to search results and may not have been made available to the user at the time the complex search query was constructed.

V. Reporting

A. Reporting Functionality

Figure 6A:
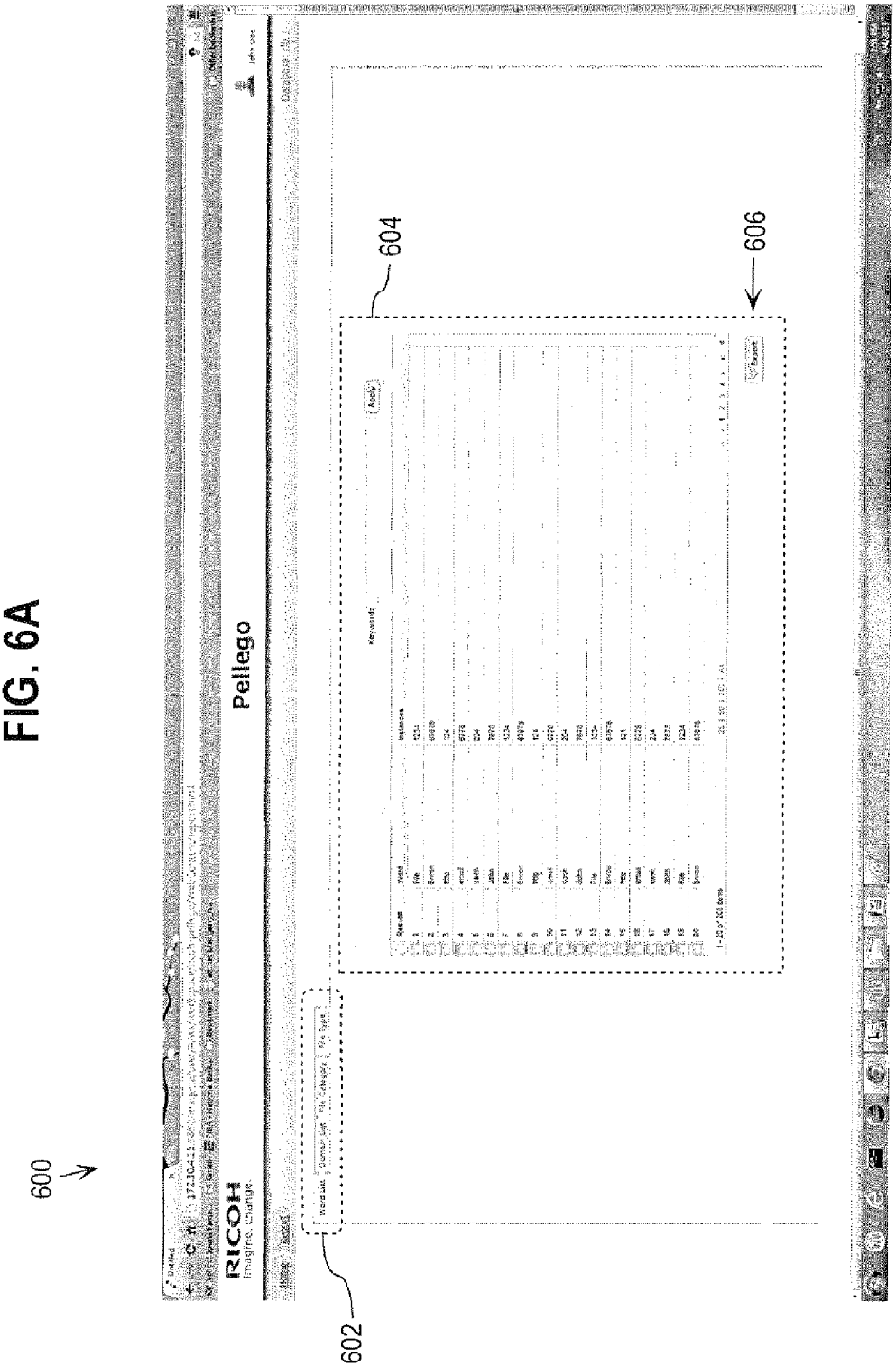
FIG. 6A depicts a user interface that provides user access to various types of reporting functionality via a set of reporting controls.

The system herein for providing electronic document retrieval and reporting may include various types of reporting functionality. FIG. 6A depicts a user interface 600 that provides user access to various types of reporting functionality via a set of reporting controls 602. In this example, reporting controls 602 are depicted as a set of user-selectable tabs which, when selected, cause the display of different reporting screens within user interface 600. The user-selectable tabs include "Word List", "Domain List", "File Category" and "File Type". The particular user-selectable tabs depicted in the figures are provided for information purposes only and embodiments are not limited to these example user-selectable tabs. FIG. 6A depicts the "Word List" tab that includes statistics 604 for a set of search results. In this example, the statistics 604 include a list of words and a number of times (instances) that each of those words appears in the set of search results. A control 606 allows data depicted in FIG. 6A to be exported, for example, to a file.

Figure 6B:
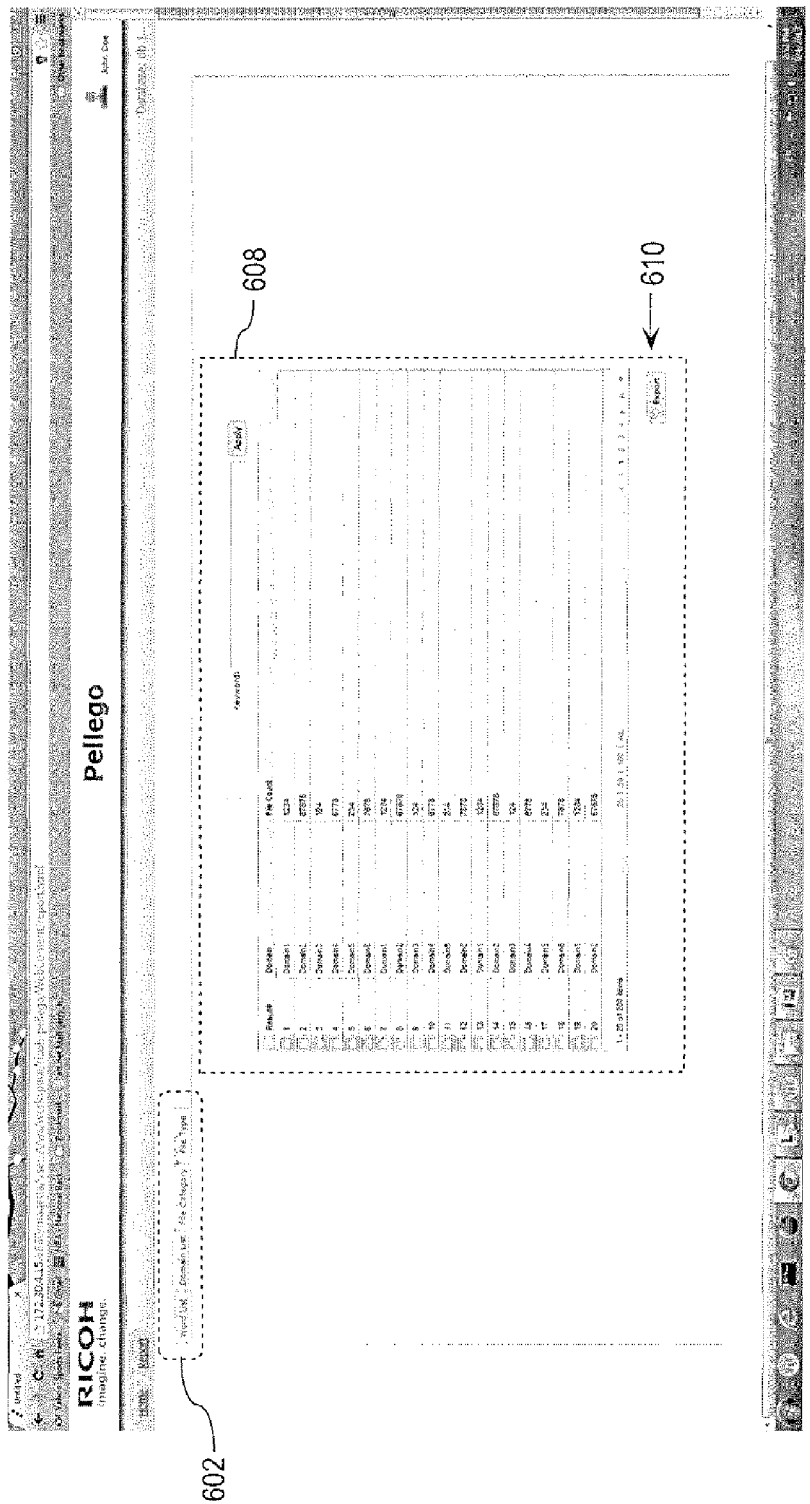
FIG. 6B depicts the "Domain List" tab that includes statistics for a set of search results.

FIG. 6B depicts the "Domain List" tab that includes statistics 608 for a set of search results. In this example, the statistics 608 include a list of data domains and a file count for each data domain for the search results, i.e., a number of files in each data domain. A control 610 allows data depicted in FIG. 6B to be exported, for example, to a file.

Figure 6C:
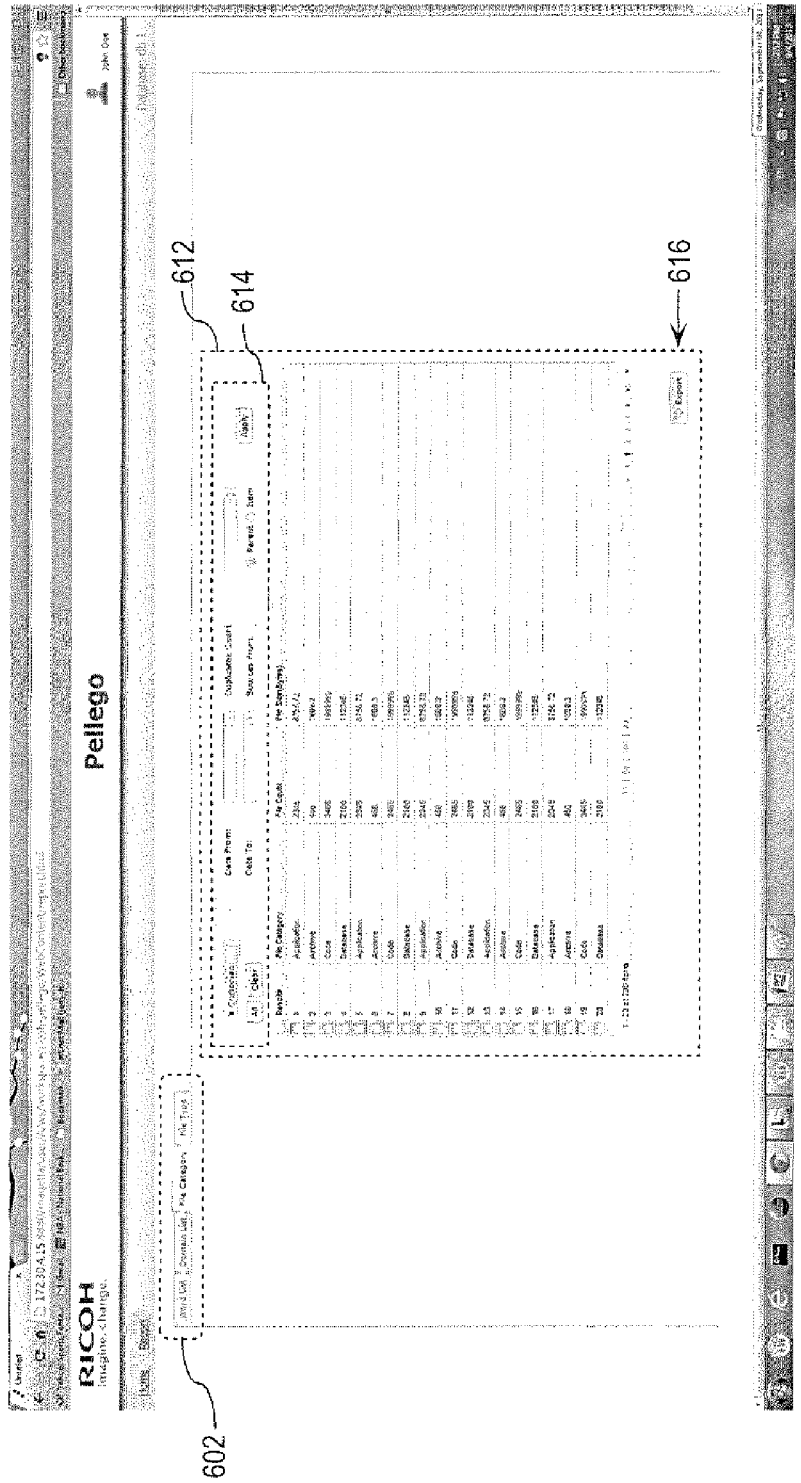
FIG. 6C depicts the "File Category" tab that includes statistics for a set of search results.
Figure 6D:
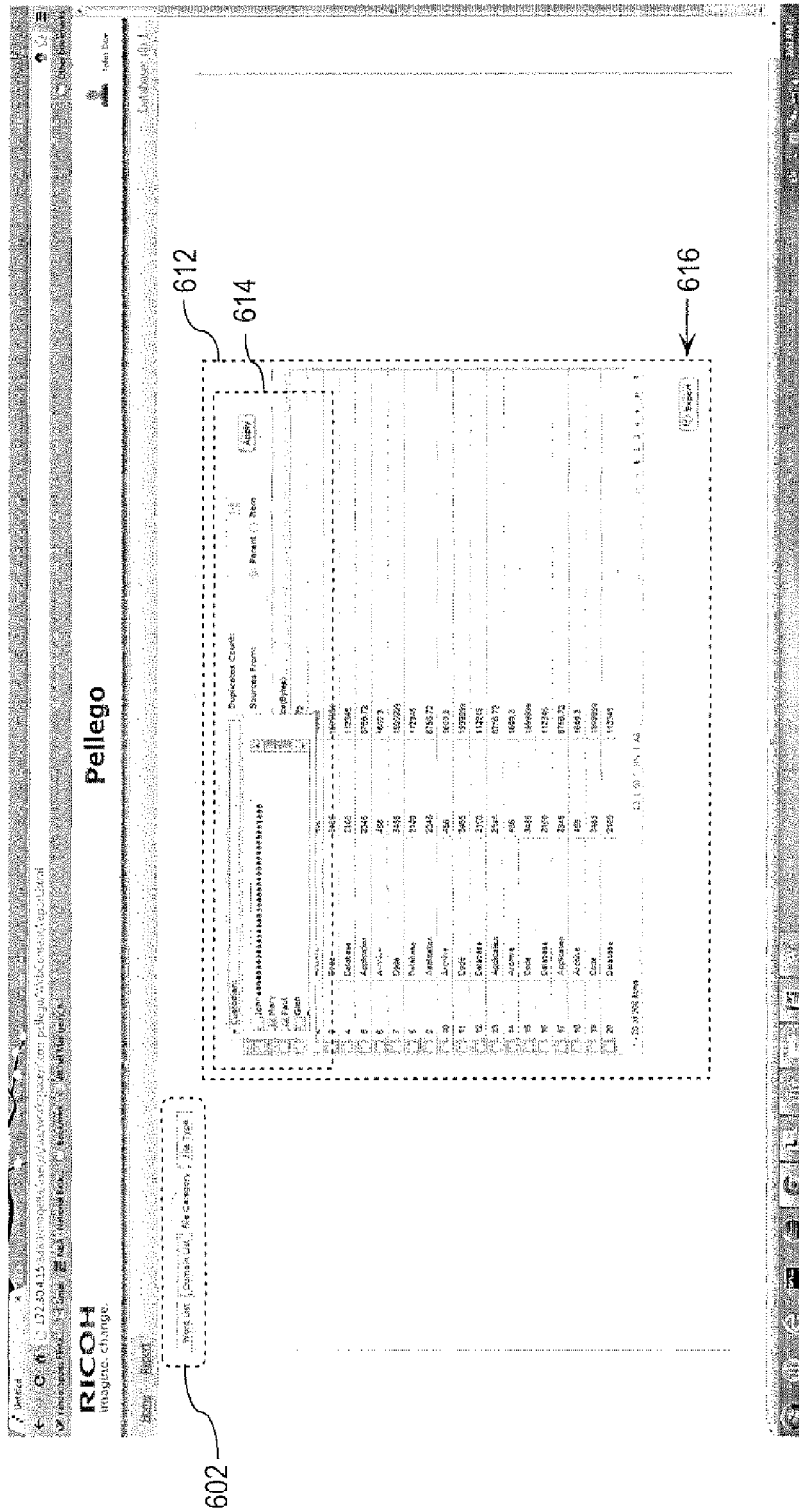
FIG. 6D depicts example filter criteria.

FIG. 6C depicts the "File Category" tab that includes statistics 612 for a set of search results. In this example, the statistics 612 include a list of file categories and a file count and file size (average) for each file category for the search results, i.e., a number of files and a file size (average) for each file category. A set of filter controls 614 allows a user to specify filter criteria to be applied to the statistics 612. The filter criteria include one or more custodians, as depicted in FIG. 6D, a date range, a duplicate count to reduce duplicates and a data source (parent/item). Filter controls 614 allow a user to narrow the search results and the corresponding statistics 612 displayed on user interface 600. Application of the filter criteria may be implemented by a user selecting the "Apply" button displayed in filter controls 614. A control 616 allows data depicted in FIG. 6C to be exported, for example, to a file.

Figure 6E:
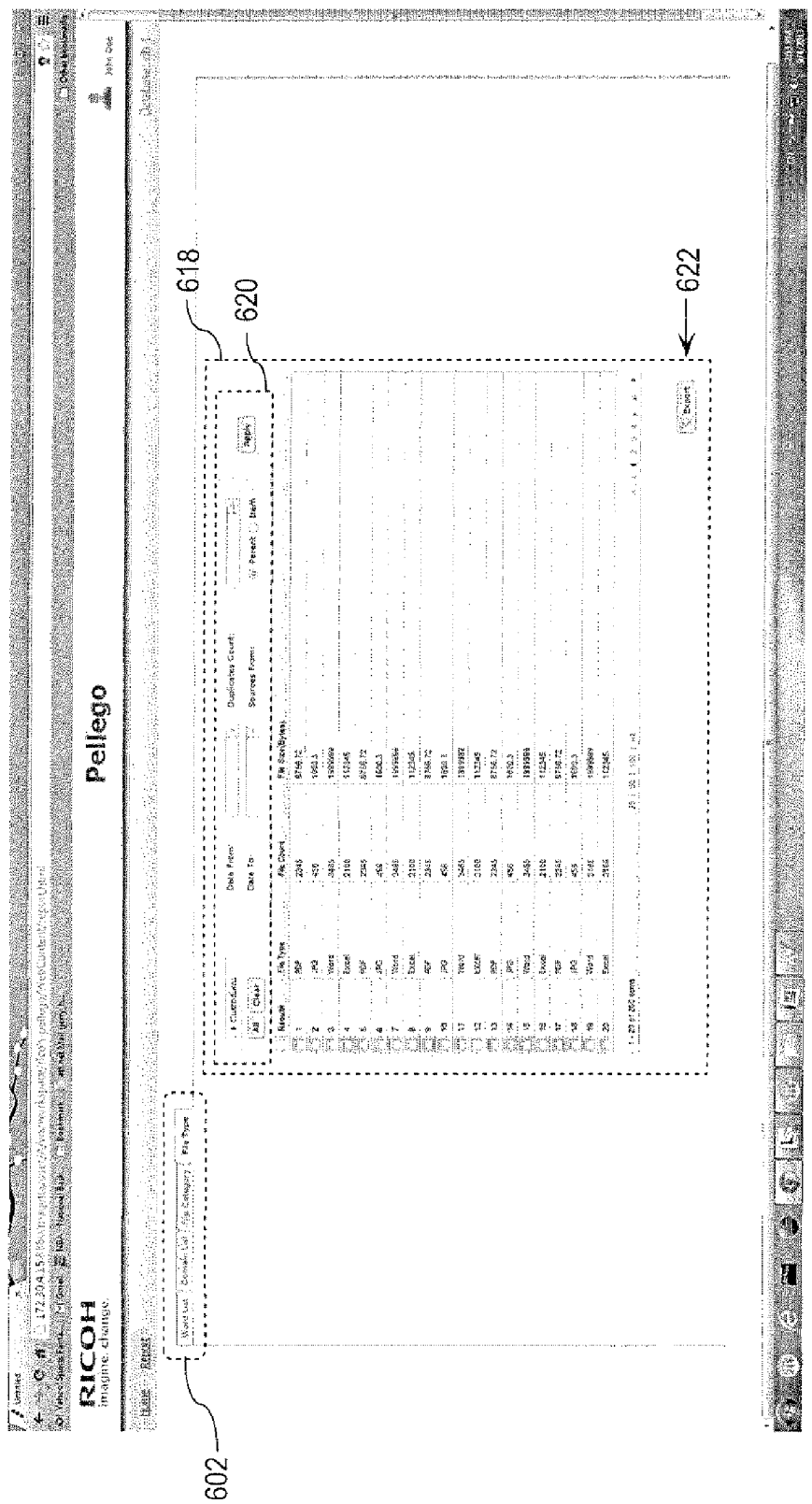
FIG. 6E depicts the "File Type" tab that includes statistics for a set of search results.

FIG. 6E depicts the "File Type" tab that includes statistics 618 for a set of search results. In this example, the statistics 618 include a list of file types and a file count and file size (average) for each file type for the search results, i.e., a number of files and a file size (average) for each file type. A set of filter controls 620 allows a user to specify filter criteria to be applied to the statistics 618. The filter criteria include one or more custodians, a date range, a duplicate count to reduce duplicates and a data source (parent/item). A control 622 allows data depicted in FIG. 6E to be exported, for example, to a file.

B. Semantic Meanings and Process Cost Estimation

According to one embodiment, semantic meanings may be used to improve the usefulness of report data. For example, referring to FIG. 6A, the statistics 604 may include a column that indicates a semantic meaning for one or more of the words. Some of the words may not have semantic meanings displayed in statistics 604. Including semantic meanings in statistics 604 can improve the relevance of the statistics 604 by providing contexts for users.

Figure 6F:
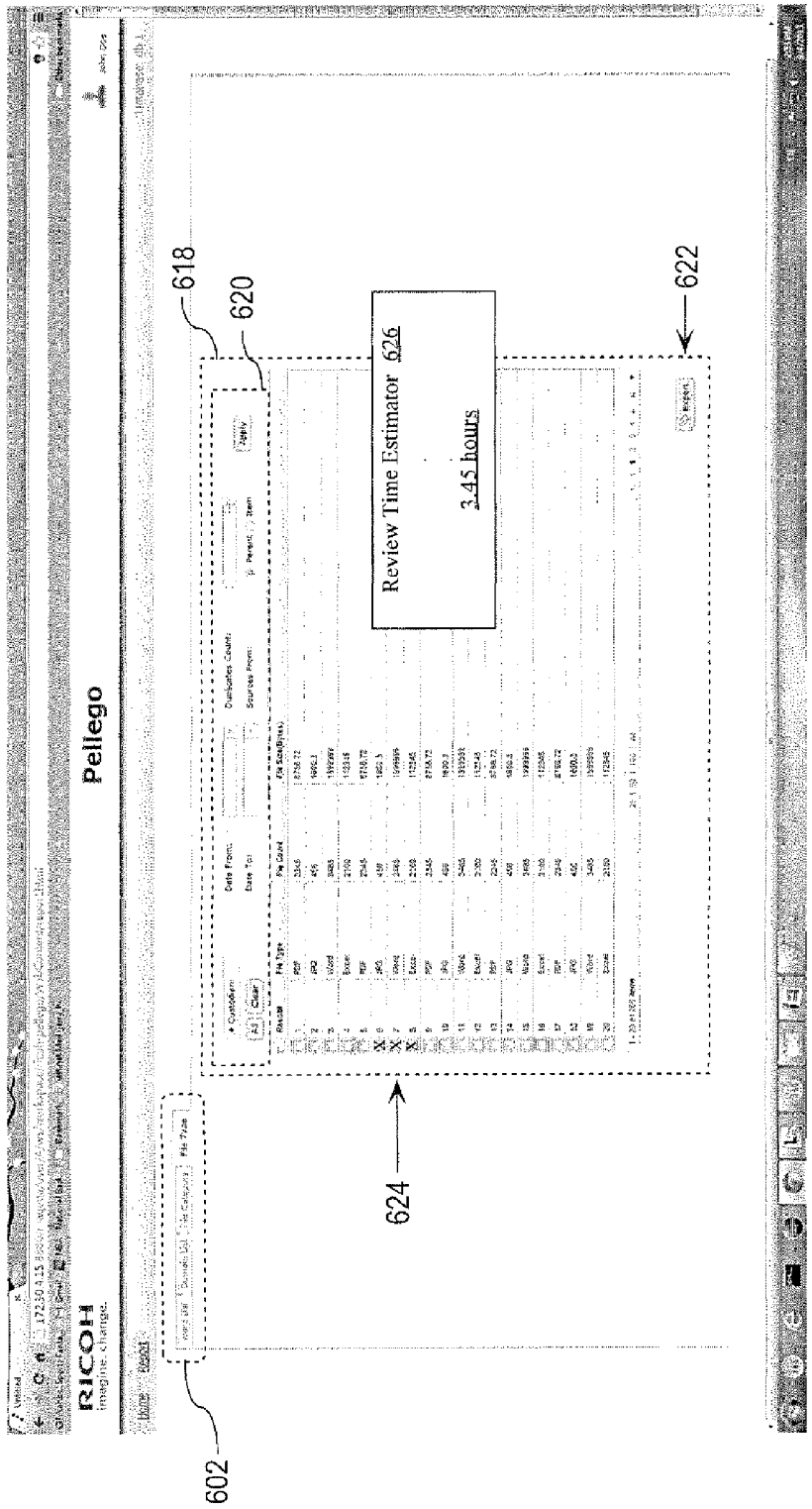
FIG. 6F depicts statistics search result items selected by a user.

In some situations, search results may include a large amount of data that may require a significant amount of time to review. The amount of time required to review search results may vary depending upon a wide variety of factors, such as the number, type and complexity of items in search results. According to one embodiment, a review time estimator provides an estimated amount of time to review specified search results. FIG. 6F depicts statistics 618 and that a user has selected search result items #6, #7 and #8 via graphical user interface controls 624. In this example, the square icon for each search result item depicted in statistics 618 is selectable and a user has selected, for example by using a point device such as a mouse, search result items #6, #7 and #8. A review time estimator 626 is provided on user interface 600 and provides an estimated review time for the selected search result items #6, #7 and #8. Review time estimator 626 may be automatically displayed on user interface 600 or may be selectable, for example, via a graphical user interface object, such as an icon or menu item. Review time estimator 626 may dynamically update the estimated time as search result items are selected and deselected. The estimated review time may be determined based upon a wide variety of factors that may vary depending upon a particular implementation and embodiments are not limited to any particular factors. Example factors include, without limitation, the number of data items, the type of data items or the size of data items. Various heuristics may be used to calculate an estimated review time for selected data items.

Figure 7:
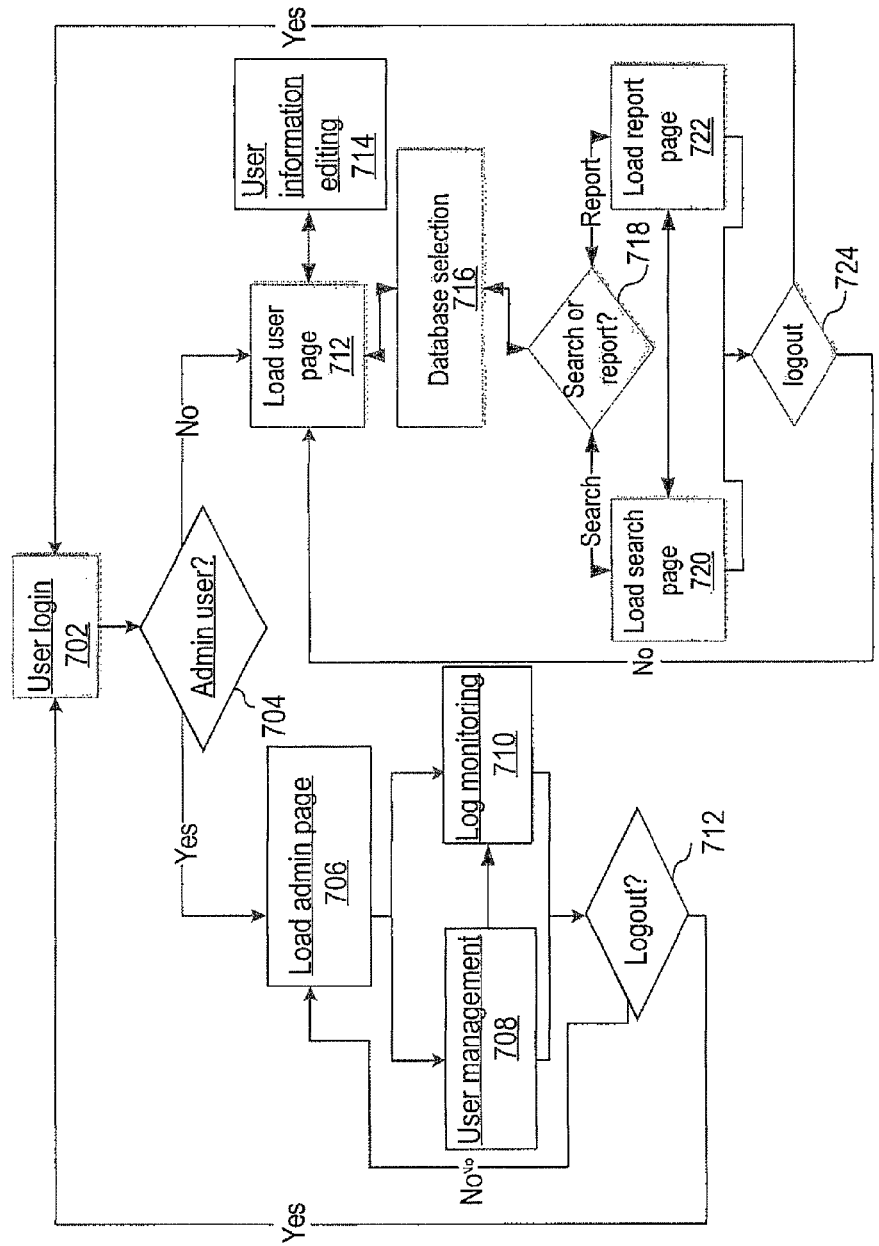
FIG. 7 is a flow diagram that depicts an approach for electronic document retrieval and reporting.

FIG. 7 is a flow diagram 700 that depicts an approach for electronic document retrieval and reporting according to an embodiment. In step 702, a user logs into the electronic document management system. For example, a user of client device 104 may use Web browser 110 to access a login Web page provided by Web Application 106. In step 704, a determination is made whether the user is an administrative user. For example, when the user logs in via the Web page, Web Application 106 may check user data 118 to determine whether the user is an administrative user.

If, in step 704, a determination is made that the user is an administrative user, then in step 706, the administrative user is given access to an administrator portal. For example, the administrative user may be given to user interface 200 as depicted in FIG. 2A that provides access to user management and logging functionality via the tabs depicted in FIG. 2A. In step 708, the administrative user accesses user management functionality, for example, as depicted in FIGS. 2A and 2B. In step 710, the administrative user accesses logging functionality, for example, as depicted in FIG. 2C. As depicted in FIG. 7, the administrative user may access both the user management functionality and the logging functionality. In step 712, a determination is made whether the administrative user has logged out of the administrator portal. If not, then the administrative user retains access to the administrator portal and control returns to step 706. If so, then control returns to step 702.

Returning to step 704, if the user is not an administrative user, then in step 712, the user is given access to a user portal. In step 714, the user is allowed to edit user information. In step 716, the user is allowed to select a data collection to access, for example, as depicted in FIG. 3. The user is then provided access to the searching and reporting functionality described herein and in step 718, a determination is made whether the user has selected to access the searching functionality or the reporting functionality. In step 720, the user may access the searching functionality, as previously described herein and depicted in FIGS. 5A-5D. In step 722, the user may access the reporting functionality, as previously described herein and depicted in FIGS. 6A-6F. In step 724, a determination is made whether the user has logged out. If not, then the user retains access to the user portal and control returns to step 712. If so, then control returns to step 702.

Figure 8B:
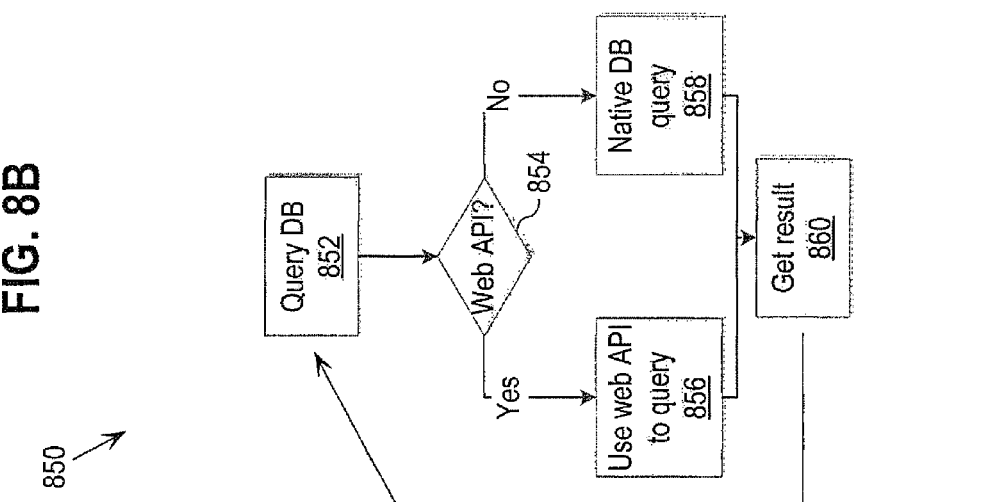
FIG. 8B is a flow diagram that depicts details of processing a query against one or more data collections.
Figure 8A:
FIG. 8A is a flow diagram that depicts an approach for searching for electronic documents using an electronic document management system.

FIG. 8A is a flow diagram 800 that depicts an approach for searching for electronic documents using an electronic document management system according to an embodiment. In step 802, a determination is made whether a user has selected to perform an advanced search. For example, as depicted in FIG. 5A, a user may select a simple search or an advanced search. If the user has not selected an advanced search, then in step 804, a simple search user interface is provided to the user, for example, the user interface 400 depicted in FIG. 4. If the user has selected an advanced search, then in step 806, the advanced search user interface is provided to the user, for example, the user interface 500 depicted in FIGS. 5A-5D.

In step 808, the user builds a query string using either the simple search user interface or the advanced search user interface. In step 810, the query is processed against one or more data collections. FIG. 8B is a flow diagram 850 that depicts details of processing a query against one or more data collections. In this example, control proceeds to step 852 of FIG. 8B to perform this step. In step 854, a determination is made whether a data API is to be used. If so, then in step 856, a data API is used, for example, data API 122. If not, then in step 858, a native query is processed against the data collections. For example, the query provided by backend 116 may be processed directly against electronic document data 122, without the use of data API 122. In step 860, the result is obtained and received in step 812. In step 814, the search results are presented, for example, as depicted in FIGS. 4 and 5A-5D.

Figure 9:
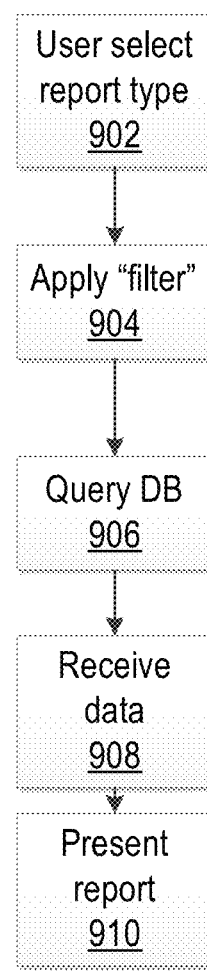
FIG. 9 is a flow diagram that depicts an approach for generating a report using an electronic document management system.

FIG. 9 is a flow diagram 900 that depicts an approach for generating a report using an electronic document management system according to an embodiment. In step 902, a user selects a report type, for example, via the various report type tabs depicted in FIG. 6A. In step 904, the user elects whether to apply one or more filters, for example, via filter controls 614 depicted in FIG. 6C. In step 906 a query is generated and applied against search results and the result is received in step 908. In step 910, a report is presented, for example, as depicted in FIGS. 6A-6F.

VI. Implementation Mechanisms

Although the flow diagrams of the present application depict a particular set of steps in a particular order, other implementations may use fewer or more steps, in the same or different order, than those depicted in the figures.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
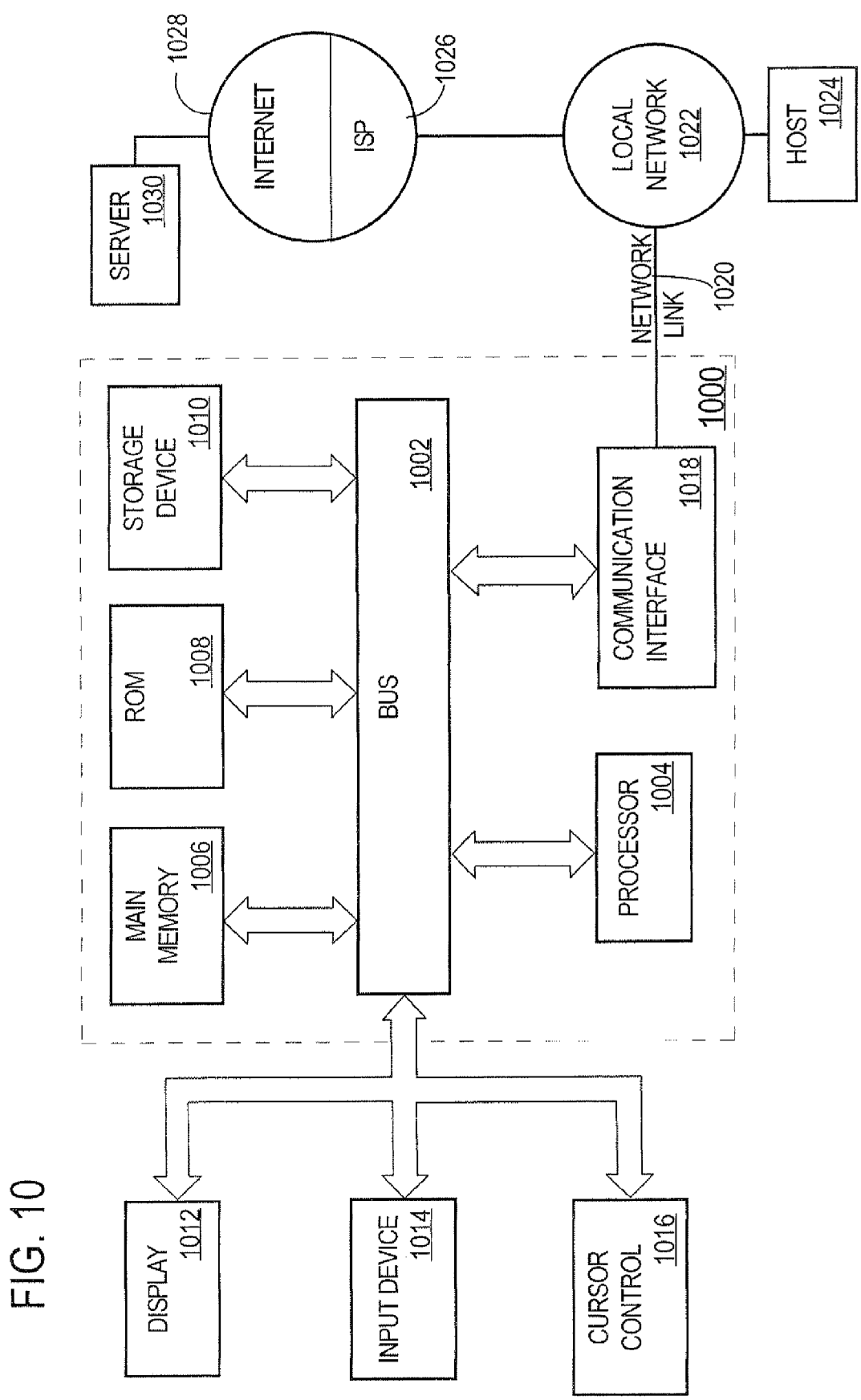
FIG. 10 is a block diagram of a computer system on which embodiments of the invention may be implemented.

FIG. 10 is a block diagram that depicts an example computer system 1000 upon which embodiments may be implemented. Computer system 1000 includes a bus 1002 or other communication mechanism for communicating information, and a processor 1004 coupled with bus 1002 for processing information. Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. Although bus 1002 is illustrated as a single bus, bus 1002 may comprise one or more buses. For example, bus 1002 may include without limitation a control bus by which processor 1004 controls other devices within computer system 1000, an address bus by which processor 1004 specifies memory locations of instructions for execution, or any other type of bus for transferring data or signals between components of computer system 1000.

An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic or computer software which, in combination with the computer system, causes or programs computer system 1000 to be a special-purpose machine. According to one embodiment, those techniques are performed by computer system 1000 in response to processor 1004 executing one or more sequences of one or more instructions contained in main memory 1006. Such instructions may be read into main memory 1006 from another computer-readable medium, such as storage device 1010. Execution of the sequences of instructions contained in main memory 1006 causes processor 1004 to perform the process steps described herein. In alternative embodiments, hard-wired circuitry may be used in place of or in combination with software instructions to implement the embodiments. Thus, embodiments are not limited to any specific combination of hardware circuitry and software.

The term "computer-readable medium" as used herein refers to any medium that participates in providing data that causes a computer to operate in a specific manner. In an embodiment implemented using computer system 1000, various computer-readable media are involved, for example, in providing instructions to processor 1004 for execution. Such a medium may take many forms, including but not limited to, non-volatile media and volatile media. Non-volatile media includes, for example, optical or magnetic disks, such as storage device 1010. Volatile media includes dynamic memory, such as main memory 1006. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution.

In the foregoing specification, embodiments have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory computer-readable media storing instructions which, when processed by one or more processors, cause:
a Web application generating and transmitting to a client device over one or more networks, one or more Web pages which, when processed by a Web browser at the client device, provide a graphical user interface that allows a user to construct a query and cause the query to be processed against electronic document data stored in an electronic document management system,
wherein the graphical user interface allows a user to construct the query by:
displaying a plurality of graphical user interface objects that visually indicate a plurality of pre-specified word/operator combinations, wherein one or more pre-specified word/operator combinations from the plurality of pre-specified word/operator combinations each includes a distance parameter that specifies a maximum allowable distance between words in the pre-specified word/operator combination, and wherein selection of a particular graphical user interface object that corresponds to a particular pre-specified word/operator combination from the plurality of pre-specified word/operator combinations causes the particular pre-specified word/operator combination to be included in the query; and
wherein the graphical user interface allows a user to perform one or more of add a new word/operator combination to the plurality of pre-specified word/operator combinations by specifying a word and corresponding operator, edit a pre-specified word/operator combination from the plurality of pre-specified word/operator combinations or delete a pre-specified word/operator combination from the plurality of pre-specified word/operator combinations.

2. The one or more non-transitory computer-readable media as recited in claim 1, wherein the graphical user interface further allows a user to specify a keyword definition to be included in and used as search terms in the query, wherein the keyword definition includes one or more of one or more keywords or one or more phrases.

3. The one or more non-transitory computer-readable media as recited in claim 1, wherein the graphical user interface allows a user to specify and have included in the query one or more of a custodian or a domain that corresponds to a portion of searchable data.

4. The one or more non-transitory computer-readable media as recited in claim 1, wherein the plurality of graphical user interface objects:
allow a user to enter one or more search query terms,
in response to entry of a particular search query term, determine two or more semantic meanings for the particular search query term,
display one or more additional user interface objects that indicate the two or more semantic meanings for the particular search query term,
in response to a user selection of a particular semantic meaning from the two or more semantic meanings, modify the query to represent the particular semantic meaning.

5. The one or more non-transitory computer-readable media as recited in claim 1, wherein the graphical user interface displays search results for the query and a semantic meaning for each of one or more search results from the plurality of search results.

6. An apparatus comprising:
one or more processors; and
one or more memories storing instructions which, when processed by the one or more processors, cause:
a Web application generating and transmitting to a client device over one or more networks, one or more Web pages which, when processed by a Web browser at the client device, provide a graphical user interface that allows a user to construct a query and cause the query to be processed against electronic document data stored in an electronic document management system,
wherein the graphical user interface allows a user to construct the query by:
displaying a plurality of graphical user interface objects that visually indicate a plurality of pre-specified word/operator combinations, wherein one or more pre-specified word/operator combinations from the plurality of pre-specified word/operator combinations each includes a distance parameter that specifies a maximum allowable distance between words in the pre-specified word/operator combination, and wherein selection of a particular graphical user interface object that corresponds to a particular pre-specified word/operator combination from the plurality of pre-specified word/operator combinations causes the particular pre-specified word/operator combination to be included in the query; and
wherein the graphical user interface allows a user to perform one or more of add a new word/operator combination to the plurality of pre-specified word/operator combinations by specifying a word and corresponding operator, edit a pre-specified word/operator combination from the plurality of pre-specified word/operator combinations or delete a pre-specified word/operator combination from the plurality of pre-specified word/operator combinations.

7. The apparatus as recited in claim 6, wherein the graphical user interface further allows a user to specify a keyword definition to be included in and used as search terms in the query, wherein the keyword definition includes one or more of one or more keywords or one or more phrases.

8. The apparatus as recited in claim 6, wherein the graphical user interface allows a user to specify and have included in the query one or more of a custodian or a domain that corresponds to a portion of searchable data.

9. The apparatus as recited in claim 6, wherein the plurality of graphical user interface objects:
allow a user to enter one or more search query terms,
in response to entry of a particular search query term, determine two or more semantic meanings for the particular search query term,
display one or more additional user interface objects that indicate the two or more semantic meanings for the particular search query term, in response to a user selection of a particular semantic meaning from the two or more semantic meanings, modify the query to represent the particular semantic meaning.

10. The apparatus as recited in claim 6, wherein the graphical user interface displays search results for the query and a semantic meaning for each of one or more search results from the plurality of search results.

11. A computer-implemented method comprising:
a Web application generating and transmitting to a client device over one or more networks, one or more Web pages which, when processed by a Web browser at the client device, provide a graphical user interface that allows a user to construct a query and cause the query to be processed against electronic document data stored in an electronic document management system,
wherein the graphical user interface allows a user to construct the query by:
displaying a plurality of graphical user interface objects that visually indicate a plurality of pre-specified word/operator combinations, wherein one or more pre-specified word/operator combinations from the plurality of pre-specified word/operator combinations each includes a distance parameter that specifies a maximum allowable distance between words in the pre-specified word/operator combination, and wherein selection of a particular graphical user interface object that corresponds to a particular pre-specified word/operator combination from the plurality of pre-specified word/operator combinations causes the particular pre-specified word/operator combination to be included in the query; and wherein the graphical user interface allows a user to perform one or more of add a new word/operator combination to the plurality of pre-specified word/operator combinations by specifying a word and corresponding operator, edit a pre-specified word/operator combination from the plurality of pre-specified word/operator combinations or delete a pre-specified word/operator combination from the plurality of pre-specified word/operator combinations.

12. The computer-implemented method as recited in claim 11, wherein the graphical user interface further allows a user to specify a keyword definition to be included in and used as search terms in the query, wherein the keyword definition includes one or more of one or more keywords or one or more phrases.

13. The computer-implemented method as recited in claim 11, wherein the plurality of graphical user interface objects:
allow a user to enter one or more search query terms,
in response to entry of a particular search query term, determine two or more semantic meanings for the particular search query term,
display one or more additional user interface objects that indicate the two or more semantic meanings for the particular search query term,
in response to a user selection of a particular semantic meaning from the two or more semantic meanings, modify the query to represent the particular semantic meaning.

14. The computer-implemented method as recited in claim 11, wherein the graphical user interface displays search results for the query and a semantic meaning for each of one or more search results from the plurality of search results.

* * * * *